(12) United States Patent
Bryson

(10) Patent No.: US 9,178,356 B2
(45) Date of Patent: Nov. 3, 2015

(54) LOW VOLTAGE SOLAR ELECTRIC ENERGY DISTRIBUTION

(76) Inventor: Robert L. Bryson, Bend, OR (US)

( * ) Notice: Subject to any disclaimer, the term of this patent is extended or adjusted under 35 U.S.C. 154(b) by 381 days.

(21) Appl. No.: 13/598,577

(22) Filed: Aug. 29, 2012

(65) Prior Publication Data

US 2014/0060100 A1    Mar. 6, 2014

(51) Int. Cl.

| H02J 1/00 | (2006.01) |
|---|---|
| H02J 3/38 | (2006.01) |
| F24F 5/00 | (2006.01) |
| G05B 15/02 | (2006.01) |
| F24F 11/00 | (2006.01) |

(52) U.S. Cl.
CPC .............. *H02J 3/385* (2013.01); *F24F 5/0046* (2013.01); *G05B 15/02* (2013.01); *F24F 11/0017* (2013.01); *F24F 2005/0067* (2013.01); *F24F 2011/0075* (2013.01); *H02J 2003/388* (2013.01); *Y02B 10/20* (2013.01); *Y02B 10/24* (2013.01); *Y02B 10/30* (2013.01); *Y02B 30/78* (2013.01); *Y02E 10/58* (2013.01); *Y10T 307/367* (2015.04)

(58) Field of Classification Search
CPC ............ H02J 3/383; H02J 4/00; H02J 3/385; H02J 2003/388; Y02B 10/14; Y02B 10/24; Y02B 30/78; Y02B 10/30; Y02B 10/20; Y02E 10/563; Y02E 10/58; F24F 2005/0067; F24F 5/0046; F24F 11/0017; F24F 2011/0075; G05B 15/02; Y10T 307/367
See application file for complete search history.

(56) References Cited

U.S. PATENT DOCUMENTS

| 6,459,175 | B1 * | 10/2002 | Potega .......................... 307/149 |
| 7,058,484 | B1 * | 6/2006 | Potega .......................... 700/297 |
| 2007/0145952 | A1 * | 6/2007 | Arcena ........................ 320/135 |
| 2008/0147335 | A1 * | 6/2008 | Adest et al. ..................... 702/64 |
| 2009/0088991 | A1 * | 4/2009 | Brzezowski et al. ........... 702/62 |
| 2010/0235206 | A1 * | 9/2010 | Miller et al. ....................... 705/7 |
| 2011/0006603 | A1 * | 1/2011 | Robinson et al. ................ 307/31 |
| 2012/0044014 | A1 * | 2/2012 | Stratakos et al. .............. 327/530 |
| 2013/0041516 | A1 * | 2/2013 | Rockenfeller et al. ......... 700/287 |
| 2014/0062191 | A1 * | 3/2014 | Bryson ............................. 307/26 |
| 2014/0062206 | A1 * | 3/2014 | Bryson ............................. 307/80 |
| 2014/0152209 | A1 * | 6/2014 | Marcinkiewicz et al. . 318/400.3 |
| 2014/0285010 | A1 * | 9/2014 | Cameron ......................... 307/29 |

* cited by examiner

*Primary Examiner* — Michael Zarroli
(74) *Attorney, Agent, or Firm* — Donn K. Harms

(57) ABSTRACT

Subject matter disclosed herein relates to distribution of electrical energy, and more particularly to distribution of solar electric energy at or near particular power points of solar cells.

6 Claims, 10 Drawing Sheets

FIG. 5

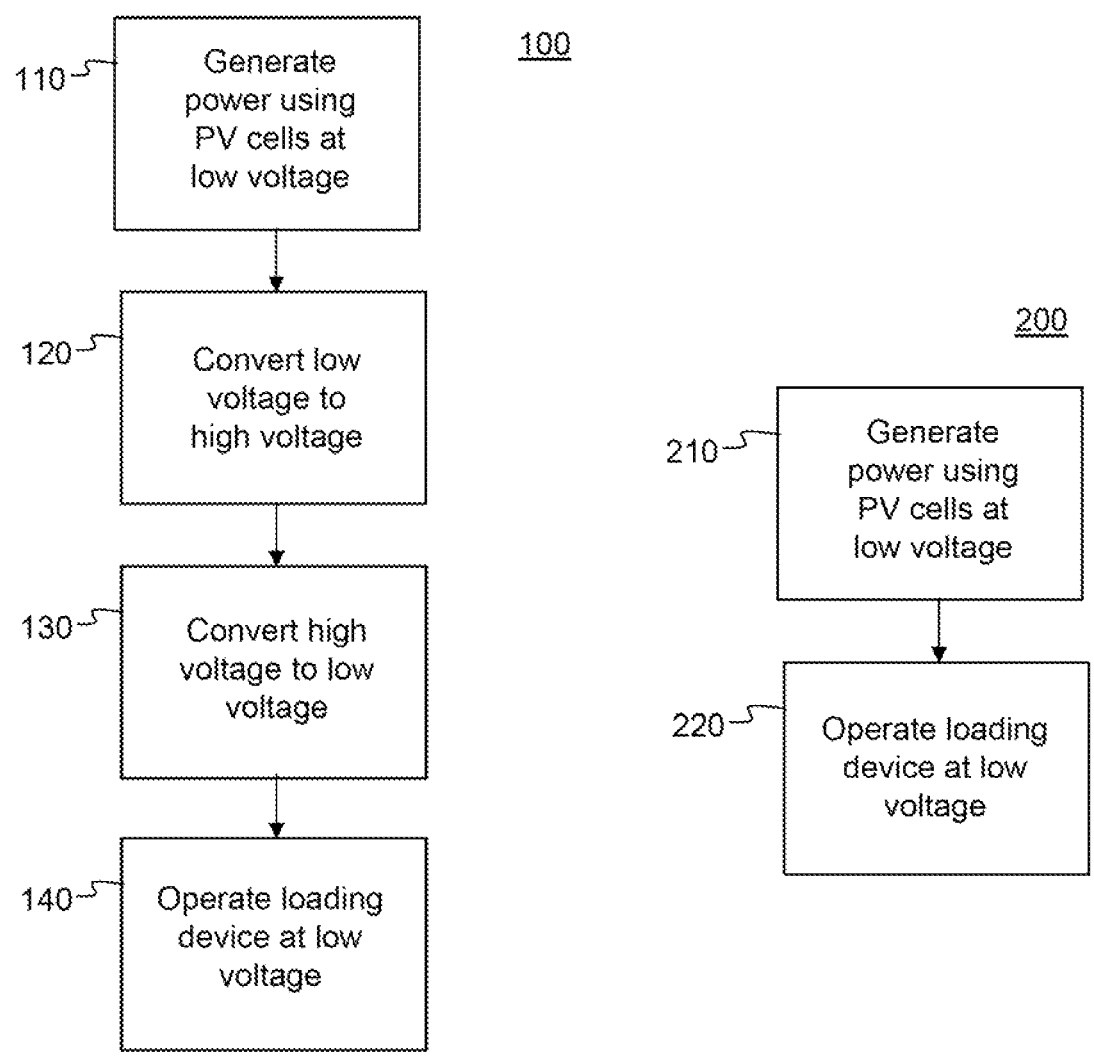

US 9,178,356 B2

LOW VOLTAGE SOLAR ELECTRIC ENERGY DISTRIBUTION

BACKGROUND

Subject matter disclosed herein relates to distribution of electrical energy, and more particularly to distribution of solar electric energy at or near particular power points of solar cells.

INFORMATION

In an effort to conserve natural resources and optimize energy usage, solar energy may be generated using any of a variety of types of photovoltaic (PV) cells. Often, solar cells may be assembled or configured into solar panels to generate particular voltages for various applications. For example, sixty solar cells may be assembled into a solar panel to generate a nominal 250 watts at about 24 volts. Such electrical characteristics, however, typically vary over the course of a day as the sun changes position in the sky. Weather conditions (e.g., cloudy or rainy versus sunny) may also affect electrical characteristics of solar panels.

Solar panels may be incorporated into electrical system of commercial or residential buildings. Electricity generated from such solar panels ma be augmented electricity from an electrical utility's grid to allow a building's electrical system to maintain a high degree of reliability regardless of solar panels' response to time of day or prevailing weather.

Direct current (DC) power (e.g., at about 28.0 volts) generated by a solar module (e.g., solar panel) may be converted into common household AC power (e.g., at about 110.0 volts) using an inverter. Some power may be lost in a conversion process, and there may be additional losses in wires from a rooftop array of solar panels to an inverter and to a house panel, for example. Modern inverters commonly used in residential PV power systems may have peak efficiencies of about 92% to 94%, which may be indicated by their manufacturers, but such values of peak efficiency may be measured under well-controlled factory conditions. Actual field conditions may often result in overall DC-to-AC conversion efficiencies of about 88% to 92%, with 90% or factor of 0.90 being a reasonable compromise. Thus, a "100-watt module" output, reduced by production tolerance, heat, dust, wiring, AC conversion, and other losses, for example, may translate into about 67.0 watts of AC power delivered to a house panel during the middle of a clear day.

BRIEF DESCRIPTION OF THE FIGURES

Non-limiting and non-exhaustive embodiments will be described with reference to the following figures, wherein like reference numerals refer to like parts throughout the various figures unless otherwise specified.

FIGS. 1 and 2 are flow diagrams of processes for providing generated solar electricity to device loads, according to an embodiment.

DETAILED DESCRIPTION

Figure 3:
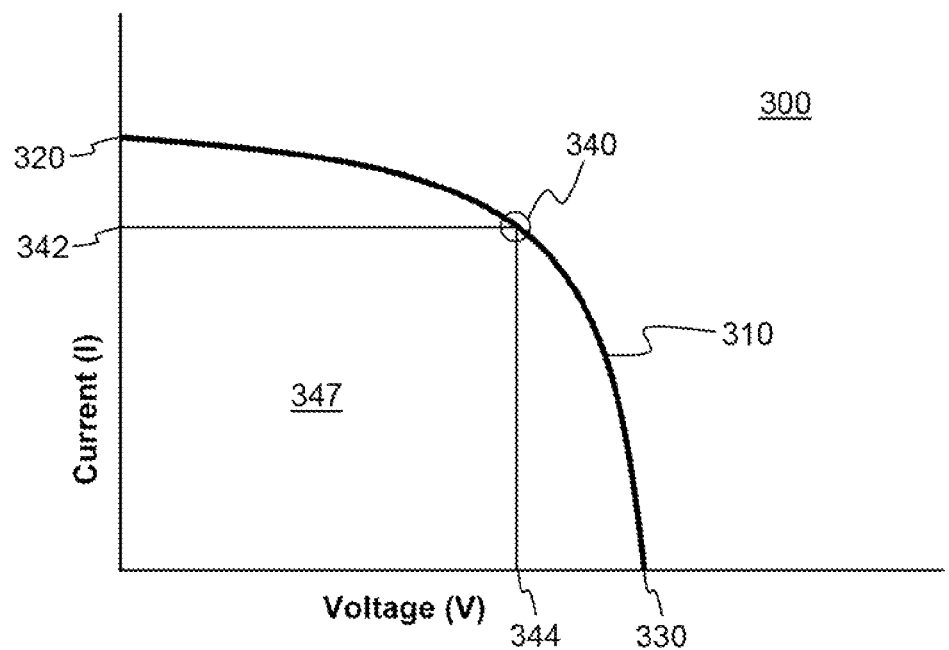
FIG. 3 is a plot of characteristics for an efficiency-power plot of a photovoltaic cell, according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

The terms "utility" and "grid" voltages mean voltages of about 110 volts, which corresponds to a standard voltage provided by utility entities in many countries, including the United States. In other countries, such utility voltages may comprise other values, such as 220 volts, just to name an example. Claimed subject matter is not limited with respect to any particular standard utility voltage. In some examples that follow, a utility standard voltage is assumed to comprise 110.0 volts, but again, claimed subject matter is not so limited.

Though solar power is recited in examples herein, claimed subject matter is not limited to solar-based power generation. Wind energy, chemical energy, or wave energy, just to name a few examples, may also be applied to embodiments of techniques, systems, or apparatuses described herein.

In an embodiment, a system or technique for providing electrical power from one or more solar panels to multiple loads may involve a number of desirable features. Solar panels, which comprise a plurality of photovoltaic (PV) cells, for example, may generate electricity at about 28.0 volts DC (direct current). Of course, solar panels may generate electricity at any other voltage, and claimed subject matter is not limited in this respect, but an output voltage of 28.0 volts will be used in a number of examples that follow. Houses, office buildings, stores, and so on may include electrical wiring configured to carry 110.0 volts, which may correspond to a utility standard voltage, as mentioned above. Accordingly, in one approach, a solar panel output power at about 28.0 volts may be provided to an inverter, for example, to up-convert, this output power to about 110.0 volts. Some electrical loads (hereinafter, "loads") in houses, office buildings, stores, and so on may operate at a nominal voltage of about 110.0 volts while other loads may operate at a relatively low voltage, such as a voltage in a range from about 6.0 volts to about 40.0 volts. Hereinafter, the term "high voltage" may mean a utility voltage (e.g., 110.0 volts) whereas the term "low voltage" may mean a voltage less than about 40.0 volts. For loads that operate at a low voltage, the utility voltage may be down-converted (e.g., via a transformer) from a high voltage to such a low voltage. Thus, in the approach just described for providing solar power to low voltage loads, low output voltage of solar panels may be up-converted (e.g., by interconnecting such panels in series) to a high voltage (e.g., to correspond to a utility voltage) and subsequently be down-converted back to a low voltage. Such an approach poses a number of disadvantages. Firstly, power may be lost (e.g., to heat) in a process of up-converting or down-converting voltages. For example, efficiencies of inverters, transformers, autoformers, or offline switches that may be used to perform such up-converting or down-converting may range from about 50% to about 99%. Thus, power loss may occur in a process of converting a solar panel's output voltage from low to high and back to low again. Secondly, having inverters, transformers, or other components to perform up-converting or down-converting may add cost or complexity to a system.

In addition to power loss that may occur in a process of converting voltage levels, power loss may also occur in a process of converting from DC to AC or from AC to DC. Returning to the example above, power loss may occur in a process of converting, a solar panel's output voltage from DC to AC, such as to correspond to line voltage. Additional power loss may occur in a process of converting from AC back to DC, such as for use with DC loads, for example. Also, having inverters, transformers, or other components to perform DC to AC to DC conversion may add cost or complexity to a system.

AC to DC conversion may involve use of a number of electrolytic capacitors, which have a relatively short lifetime, compared to a number of other types of electronic components. For example, an electrolytic capacitor may be rated with a lifetime of 2000 hours at 105 degree (Celsius) operating temperature. Thus, it may be desirable to avoid use of electrolytic capacitors in a system.

FIG. 1 is a flow diagram of a process 100 for providing generated solar electricity to low voltage device loads in a building, according to an embodiment. Such low voltage device loads may include computers, printers, copy/fax machines, telephones, light-emitting diode (LED) lighting, clocks, radios, televisions, stereo equipment, just to name a few examples. Process 100, similar to that described in the example above, may be relatively inefficient compared to processes described below (e.g., process 200 of FIG. 2). At block 110, one or more solar panels comprising PV cells may generate electrical power in response to receiving solar radiation. As described above, such solar panels may produce such electrical power at a low voltage (e.g., 28.0 volts). At block 120, the low voltage output of the solar panels may be up-converted to a high voltage (e.g., 208, 220, or 480 volts) to correspond to a utility voltage present in wiring of the building. Such up-conversion may be performed by inverters that involve power loss. At block 130, such high voltage may be down-converted to a low voltage to correspond to a low voltage device load. Such down-conversion may be performed by a transformer and may involve power loss. For example, a low voltage device load may comprise a computer printer that operates at 32.0 volts. Accordingly, in this example, a "wall wart" or transformer may be used to down-convert 110.0 volts to 32.0 volts. At block 140, the low voltage device load, such as the computer printer, for example, may be operated at a low voltage.

FIG. 2 is a flow diagram of a process 200 for providing, generated solar electricity to low voltage device loads in a building, according to another embodiment. Process 200 comprises an example embodiment to show relatively high efficiency compared to that of process 100. For example, process 200 involves generating solar panel power at low voltage block 210) and subsequently operating low voltage loads at a low voltage (e.g., block 220). In contrast, process 100 involves generating solar panel power at low voltage, up-converting to high voltage (e.g., by interconnected a plurality of solar panels in electrical series), subsequently down-converting to low voltage, and then operating low voltage loads at the low voltage. Thus, a process such as 200 that maintains low voltage solar power (e.g., generated at solar panels) at low voltage, and maintains the low voltage solar power in direct current (DC) may allow for the solar power to be more effectively utilized in electronic products. Such a process, however, may involve a challenge of managing loads such that solar power is more efficiently utilized, as explained below.

In one embodiment, a technique may be employed to manage loads and monitor load consumption, solar production, or a charge state of any back-up batteries. In one implementation, an intelligent user interface and control may be involved in such a technique. For example, at least partial control of a building's loads may be initiated at one or more wall-mounted information-and-control panels. In another example, at least partial control of a building's loads may be initiated via an intranet or internet interface or smart phone application. In a particular implementation, a technique for managing loads and monitoring load consumption, among other things, may involve three parts: a DC system controller, a DC to DC point-of-load converter, and a control panel.

A DC system controller, for example, may comprise a power control and distribution system. Such a DC system controller may manage and blend a plurality of distinct power sources and may provide control and load protection to various DC loads. Distinct power sources may comprise solar panels, wind-driven generators, batteries, or a utility, just to name a few examples. Types of loads that may be readily adapted to operating via a system that provides DC power include, just to name a few examples, LED lighting; computer or server power supplies; power over Ethernet (POE) telephony; telecomm switchgear; security system or alarms; notebook computer chargers; tablet or mobile phone chargers; audio or video systems; HVAC ventilation system or components; or fire or smoke alarms.

A DC to DC point-of-load converter may match low voltage DC power to load device specifications. For example, DC to DC point-of-load converter may up-convert or down-convert one particular low voltage of a power bus to another particular low voltage on which a particular load device operates. Such a DC to DC point-of-load converter may have a relatively small form factor and operate with a relatively high efficiency in a range from about 93.0% to about 99.0%, though claimed subject matter is not limited in this respect. Some example situations of matching low voltage power on a bus to that of a low voltage load device are as follows: LED controllers may utilize constant current drivers and ensure proper voltage headroom; 28.0 volts (DC) may be stepped up to 48.0 volts for POE; 28.0 volts may be stepped down to 12 volts as primary power for computer power supplies; 28.0 volts may be stepped down to 5.0 volts or 3.3 volts for secondary power for computer power supplies; 28.0 volts may be stepped down to 5.0 volts for USB power; Notebook computers may be device specific, but operate using less than 28.0 volts; and power supplies for brushed or brushless DC motors may be device specific, but operate using less than 28.0 volts. In one implementation, a size of a DC to DC point-of-load converter may be approximately 10 to 50% the size of an AC adapter for converters for many of the above examples. In another implementation, a power line communication link may be present at a load device to allow for at least some control of the load device's operation or to allow for status reports of the load device at the controller, as described below. A control panel, which may comprise a system control panel or a load control panel, may utilize power line communication to send information to a load anywhere in a system to control lights, building ventilation, or other loads. Such a control panel may also utilize sensors to determine room occupancy, ambient lighting level, or temperature.

A control panel may comprise a system control panel and a load control panel. In an implementation, a system may comprise one system control panel and one or more load control panels. A system control panel may be included with a DC system controller enclosure or comprise a stand-alone device. A system control panel may receive updates and send messages over a power line communication link. Power line communication links may be utilized to control loads, display pertinent system information and provide telemetry and control information back to a system control panel. Software configuration may change displayed information on the system control panel to provide information regarding the following via a display: instantaneous power usage; daily solar or wind power generated; battery state of charge and time remaining at current load; grid power consumed; current state of loads and on off switch for each; unit serial number, configuration and provisioned state; graphic profile pattern of solar production; and graphic profile of battery charge profile. In a particular implementation, such a display may comprise a relatively high-quality display such as, but not limited to, improved black nematic (IBN) black and white liquid crystal display (LCD) or a single color organic light emitting diode (OLED) emissive technology, which need not include backlighting. On the other hand, a load control panel may include a display that also may comprise a bi-stable cholesteric display, which need not use power to drive the display: power need only be used if an image in the display is changed. Also an image may be retained after power is no longer provided to the display.

Embodiments described herein may include processes or electronic architecture to receive electrical power from one or more solar panels and/or a line source, and provide at least a portion of the electrical power to any of a plurality of electrical loads. Such providing electrical power may be responsive to a deviation of electrical characteristics corresponding to the electrical power from a maximum power point of the solar panels. Electrical characteristics may comprise voltage or current, for example. Thus, in one implementation, an amount of power provided to loads may be adjusted in response to a deviation of voltage (e.g., or current) from a maximum power point of solar panels. For example, in one particular implementation, an amount of electrical power provided to any of a plurality of electrical loads may be increased in response to a voltage deviation being positive with respect to an MPP. In another particular implementation, an amount of electrical power provided to any of a plurality of electrical loads may be decreased in response to a voltage deviation being negative with respect to an MPP. In one embodiment, a portion of electrical power generated by solar panels may be provided to a line source (e.g., a utility's grid) in response to a voltage corresponding to the electrical power being greater than a voltage corresponding to an MPP. Maximum power point is described as follows.

FIG. 3 is a plot of characteristics for an efficiency-power plot 300 of a PV cell, according to an embodiment. The horizontal axis may represent voltage of power generated by a PV cell and the vertical axis may represent current of the power generated by the PV cell. A solar panel may comprise a plurality of such PV cells, for example. A PV cell may have a relatively complex relationship between its operating conditions and the maximum power the PV cell may produce. For example, a PV cell may have an approximately exponential relationship between current and voltage. Curve 310 may comprise a representation of how current of a PV cell varies with changing voltage of the PV cell. For example, point 320 may represent a short-circuit current, whereas point 330 may represent an open-circuit voltage. For any given set of operational conditions, a PV cell (or cells) may have a single operating point, called the maximum power point (MPP) 340 where values of current (I) and voltage (V) of the cell result in a relative maximum power output. At such an MPP, an area of a rectangle 347, corresponding to power, formed by a horizontal projection 342 and a vertical projection 344 from MPP 340 may reach a relative maximum, compared to rectangles formed by other points on curve 310, for example. In some implementations, an MPP of solar panels (e.g., comprising a plurality of PV cells) may comprises a voltage in a range from about 27.0 volts to about 31.0 volts (e.g., 28.0 volts).

In an embodiment, a process or electronic architecture may involve receiving (e.g., onto a bus) electrical power from one or more batteries in addition to one or more solar panels and/or a line source. Batteries may comprise any of a number of types, such as sealed lead acid, absorbed glass mat (AGM), or sodium-metal-halide, just to name a few examples. Such batteries may function as backup batteries to provide power to a solar power system while solar panels, for example, are not generating power sufficient for any particular application, such as at night or during heavy power usage. On the other hand, during times of surplus power generation, solar panels may charge such batteries.

In an embodiment, a process or electronic architecture for managing power generated by a plurality of photovoltaic panels may involve monitoring electrical characteristics of a bus that receives electrical energy from the photovoltaic panels, and operating one or more switches to adjust electrical loading on the bus to maintain the electrical characteristics substantially at an MPP of the photovoltaic panels. For example, such electrical characteristics may comprise voltage or current. A bus may comprise an electrical conductor (e.g., one or more wires, cable, rigid metal bars, printed circuit board metallic trace, etc.) or group of conductors electrically connected to peripheral conductors in which electrical current flows into or out of the bus from a power source or to a load. Claimed subject matter is not limited to a bus having any particular material, shape, size, or characteristic other than electrical conductivity, for example.

In one implementation, managing power generated by a plurality of photovoltaic panels may involve adjusting an amount of grid power added to the bus to adjust the electrical characteristics so as to be substantially at a maximum power point of the photovoltaic panels. In another implementation, managing power generated by a plurality of photovoltaic panels may involve receiving signals indicative of whether one or more loads are switched on or off, and operating one or more switches based, at least in part, on the received signals. Such signals may comprise electronic signals, optical signals, electromagnetic signals, or any torr of energy that provides information between, locations. However, in a particular example embodiment, signals may comprise electronic signals transmittable over electrical power lines.

In still another implementation, managing power generated by a plurality of photovoltaic panels may involve operating one or more variable loads to reduce step-wise electrical loading by one or more loads, as described in detail below. For example, one or more variable loads may comprise heaters or fans. Operating, such one or more variable loads may be based, at least in part, on time of day, weather, or number of occupants in a particular area, for example. In a particular implementation, a bus may receive, in addition to electrical energy from photovoltaic panels, electrical energy from one or more batteries, in such a case, a process or electronic architecture for managing power generated by the photovoltaic panels may involve controlling an amount of electrical energy flow from one or more batteries to reduce step-wise electrical loading by one or more loads. For example, such batteries may by utilized if photovoltaic panels fall short of generating sufficient power (e.g., such as during night).

In an embodiment, a system may comprise a bus to receive electrical power from one or more solar panels and/or a line source, and a plurality of switches to selectively provide at least a portion of the electrical power to any of a plurality of electrical loads. Here, the switches may be operable to maintain electrical characteristics of the bus substantially at or near a MPP of the solar panels. Such a system may be operable without use of electrolytic capacitors. For example, such electrical characteristics may comprise voltage or current in a particular implementation, the bus may further receive electrical power from one or more batteries. In one example, a micro inverter may provide at least a portion of electrical power from one or more solar panels to a line source. In some cases, switches may provide overload current protection to electrical loads. In another embodiment, a system may include a bus that comprises a solar panel bus and a line source bus, wherein the solar panel, bus receives electrical power from solar panels and the line source bus receives electrical power from a line source, as described below.

In another embodiment, a system may comprise a controller to: operate a first set of switches to selectively provide electrical power from one or more solar panels and/or a line source to a bus, and operate a second set of switches to selectively provide at least a portion of the electrical power to any of a plurality of electrical loads. Described in further detail below, a controller may comprise an electronic circuit or circuits including one or more processors for executing code or including discrete electronic components.

As in embodiments described above, a first set of switches or a second set of switches may be operable to maintain electrical characteristics of a bus substantially at or near a MPP of solar panels. In one implementation, a controller may further operate the second set of switches to provide electrical power from one or more batteries to maintain electrical characteristics of the bus substantially at or near the MPP. In another implementation, the controller may further operate a micro inverter or switches to the micro inverter to provide at least a portion of electrical power to a line source. In a particular example, MPP may comprise a voltage in a range from about 27.0 volts to about 31.0 volts, though claimed subject matter is not so limited. In one embodiment, the bus may comprise a solar panel bus and a line source bus, wherein the solar panel bus may receive electrical power from solar panel and the line source bus may receive electrical power from a line source.

In an embodiment, a switching device (e.g., 570, described below) may comprise one or more input ports to receive electrical current from a plurality of electrical generators, such as photovoltaic panels or wind turbines (which may be grouped by the term "green energy", for example). Such a switching, device may also comprise one or more switches to selectively transmit at least a portion of received electrical current to an output port. Electronic circuitry may detect a presence or no presence of a ground fault based, at least in part, on measurements of electrical current. For example, a ground fault of a solar panel may correspond to a difference between current in a positive lead and a negative lead of the panel. The difference, or imbalance, may comprise a ground fault current. The electronic circuitry may operate the one or more switches to maintain at least a portion of the electrical current at the output port during to presence of a ground fault, should one exist. Such a switching device may operate with currents at a voltage of less than about 40.0 volts, such as 28.0 volts, for example. In one implementation, the electronic, circuitry may comprise a microprocessor. In another implementation, the electronic circuitry may comprise a ground fault circuit interrupter (GFCI) to perform detecting, a presence or no presence of a ground fault for more than one of the plurality of generators. The switching device may further comprise nonvolatile memory to store values representing electrical characteristics of individual generators (e.g., history of current or voltage output, number of operational failures, etc.).

A switching device, in response to a presence of a ground fault, may operate one or more switches to disconnect substantially all of a plurality of generators from an output port and subsequent to the disconnecting, individually reconnect the plurality of generators to search for one or more of the plurality of generators contributing to a presence of a ground fault, should one exist. If, however, there is no presence of a ground fault, then electronic circuitry of a switching device may operate one or more switches to round-robin disconnect individual of the plurality of generators from the output port to measure any change in a ground fault current in response to the disconnecting, for example. The generators may be electrically configured in parallel with one another. In one implementation, electronic circuitry of a switching device may respond, at least in part, to a position or state of one or more switches of an electrical switch shut-off box. For example, such a shut-off box may comprise a Knox-Box®, available from Knox Company of Phoenix, Ariz. Of course, such a description of a switch shut-off box is merely an example, and claimed subject matter is not so limited.

In an embodiment, a method of operating a switching device (e.g., 570, described below) may comprise a technique for avoiding an interruption of supply of electricity from a number of generators upon or after the occurrence of a ground fault. For example, an undesirable situation may be where one among several generators defectively experiences a ground fault that interrupts a supply of electricity from all the generators, even though the generators other than the one experiencing a ground fault are operating correctly. Accordingly, a method embodiment provides a benefit of allowing a presence of a ground fault in one or more of a plurality of generators while avoiding interruption of electricity flow of properly operating generators. Such a method may comprise measuring electrical current generated by a plurality of generators such as solar panels or wind turbines; determining which one or more of the generators is responsible for a ground fault, should one be present; disconnecting from an input port the one or more of the generators responsible for such a ground fault; and providing at least a portion of the electrical current at an output port during, a presence of the ground fault. A voltage corresponding to such an electrical current may comprise low voltage, such as less than about 40 or 50 volts, for example. The generators may be electrically configured in parallel with one another so as to provide additive currents while maintaining relatively low voltages of the individual (or serially-connected subsets of the) generators. For example, four 28 volt solar panels (e.g., the solar panels are designed to generate a nominal 2.8 volts under sufficient conditions) connected in series with one another may generate a current having a voltage of 112 volts (e.g., a high voltage), whereas the solar panels connected in parallel with one another may generate a current having a voltage of 28 volts (e.g., a low voltage). As an additional example, the four solar panels connected so that two subsets comprising two generators connected in series are connected in parallel may generate a current having a voltage of 56 volts.

In an embodiment, an apparatus may comprise a controller to determine an amount of excess electrical power produced by solar generators or wind generators, and operate one or more switches so as to use at least a portion of the excess electrical power to modify air conditions in a building. Such excess electrical power may correspond to a voltage in excess of an MPP of solar generators. For example, if a solar panel generates about 32.0 volts, then excess electrical power may correspond to about 4.0 volts if the MPP of the solar panel is about 28.0 volts. Accordingly, such excess electrical power may be used to modify air conditions in a building by operating one or more thus, just to name one example. The controller may operate one or more switches (e.g., by switching to a closed position) to provide enough electrical current to one or more fans so as to load down the 32.0 volts generated by the solar panel to the MPP level of 28.0 volts (e.g., using the excess electrical power corresponding to the 4 volt difference).

In one implementation, the apparatus may further comprise an input port to receive measurements of air conditions, wherein the controller may further operate one or more switches based, at least in part, on the air conditions. Such air conditions may comprise carbon dioxide level, temperature, humidity, or barometric pressure, just to name a few examples. Such switches need not be on/off switches, but may be rheostat-type adjustable to allow varying amounts of electrical current through. Thus, for example, if measurements of air temperature in a particular room is above a threshold, a controller may operate one or more switches (e.g., by switching to a closed, open, or partially closed position) to provide or adjust an amount of electrical current to one or more fans to cool the air in the room by circulating the air with the fans. Similarly, in another example, electrical current may be provided to air conditioners.

In another implementation, the apparatus may further comprise an input port to receive electronic, signals representative of occupancy levels for one or more portions of a budding, wherein the controller may further operate one or more switches based, at least in part, on the electronic signals representative of occupancy levels. Thus, for example, if an occupancy level in a particular room is above a threshold, a controller may operate one or more switches (e.g., by switching, to a closed, open, or partially closed position) to provide or adjust an amount of electrical current to one or more fans to maintain a desirable or comfortable level of fresh air in the room.

In an embodiment, electrical current for a load may be switched at a location remote from a switch or sub-controller that a user may operate. For example, a user may operate a light switch or sub-controller in a room to turn on, off, or adjust a level of brightness of lights in the room. In response, the light, switch or sub-controller may generate an electronic signal and send this signal over power lines (that power the lights) to a controller that may be remote from the switch or sub-controller. Such an electronic signal generated by a switch or sub-controller may comprise encoding to characterize actions of a user on the switch or sub-controller (e.g., whether the user selected to turn lights off, or to dim the lights, etc.), or to identify the room where the switch or sub-controller is located. The controller receiving the electronic signal may monitor a number of power lines for signals generated at such switches or sub-controllers. The controller may also monitor a voltage on a bus that may be used to provide power to the number of power lines. The voltage on the bus may be compared to MPP of solar panels that provide power to the bus. The controller may also monitor what sources provide what portions of the electrical power on the bus. For example, electrical power on a bus may comprise 55% solar-generated power, 15% battery power, and 30% utility power.

Accordingly, an embodiment of a method of operating a device, such as a controller, may comprise receiving, via low-voltage power lines, an electronic signal representative of a request to change a state of operation of a low-voltage electrical load that receives low-voltage power from a bus via the low-voltage power lines; comparing a voltage on the bus with an MPP of solar panels that, at least in part, provide power to the bus; and determining whether to change a state of at least one other load based, at least in part, on the comparing, as described below. Such low-voltage power lines may be structurally integrated with a building. For example, the power lines may penetrate or be attached to structural elements (e.g., framing members) of a building. A request to change a state of operation of a low-voltage electrical load may comprise a user selection for adjusting brightness or turning lights on/off via a sub-controller. As mentioned above, an electronic signal representative of such a request may be encoded to identify a location of the electronic signal source. Thus a controller may identify a location of an electrical load corresponding to (e.g., in a same room as) a sub-controller based, at least in part, on said electronic signal.

As mentioned above, a controller or other device may determine whether to change a state (e.g., turn on/off or adjust) of at least one other load other than the load associated with the request received over the power lines. For example, one load may comprise a lighting load and the other load may comprise a motor. Such a determination may be based, at least in part, on the comparing of a voltage on the bus with an MPP of solar panels. For example, a controller or other device may determine whether to operate one or more switches to provide power to, or to change a state of, a load, such as a motor of a fan or air conditioner, for example. Doing so may be useful in allowing a voltage on the bus to decrease to a level closer to MPP. Such a determination may also be based, at least in part, on air conditions (e.g., carbon dioxide level, oxygen level, temperature, humidity, or barometric pressure) in one or more rooms of a building.

Figure 4:
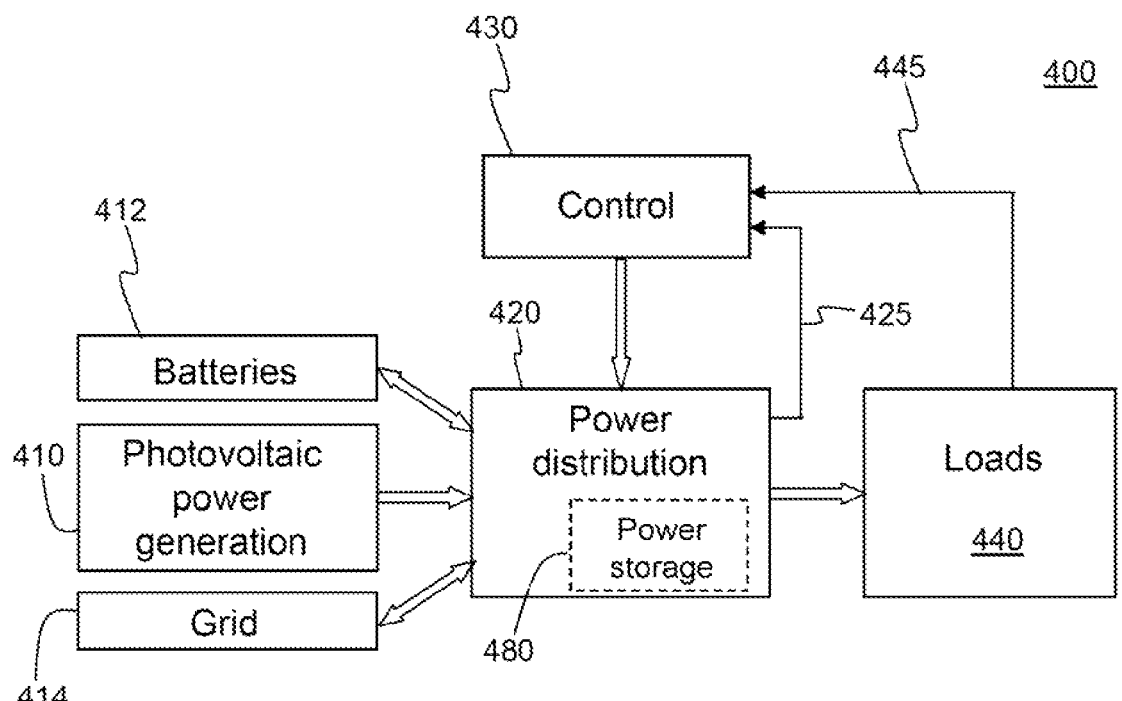
FIG. 4 is a flow diagram of a process for providing power, including generated solar power, to device loads, according to an embodiment.

FIG. 4 is a flow diagram of a system 400 for managing and providing power, including generated solar power, to device loads, according to an embodiment. For example, system 400 may be employed to manage loads and monitor load consumption, solar production, or a charge state of any back-up batteries. In one implementation, an intelligent user interface and control (e.g., load controller 541 through 549) may be involved in such a process.

Power distribution 420 may comprise electric or electronic circuitry including conductive wires or cables, switching devices, overload protection devices, or any combination thereof. Power distribution 420 may also include power storage 480 comprising chemical potential energy (e.g., batteries) or mechanical potential energy (e.g., mass in a gravitational field, such as water stored in a tank). In one implementation, power distribution 420 may include a bus to receive and distribute electrical power. For example, such a bus may receive electrical power from one or more PV cells (e.g., solar panels) 410, a grid or utility system 414, or one or more batteries 412. Such a bus may provide electrical power to one or more loads 440. Such receiving and providing electrical power may be at least partially controlled by a controller 430, which may comprise a processor, discrete logic circuitry, or any combination thereof. In one implementation, controller 430 may receive information regarding, a state of loads 440 via a feedback path 445. In another implementation, controller 430 may receive information regarding a state of at least a portion of power distribution 420 via a feedback path 425. For example, controller 430 may receive information regarding positions of switches operating on flow of electrical power from a bus in power distribution 420 to loads 440 or from power sources 410, 412, or 414 to the bus, in another example, a state of power distribution 420 may comprise a voltage of a bus. Accordingly, controller 430 may receive information regarding a voltage on a bus or by how much such voltage compares to an MPP of PV cells (e.g., 410). In such a case, for example, controller 430 may operate one or more switches to adjust an amount of electrical power flow from the bus to loads 440. Similarly, controller 430 may operate one or more switches to adjust an amount of electrical power flow to the bus from PV cells 410, batteries 412, or from grid 414. For example, if a voltage on the bus is greater than an MPP, then controller 430 may operate a number of switches to increase electrical power flow to loads 440 with intent, at least in part, to lower the voltage on the bus, as described in further detail below.

In a particular implementation, controller 430 may comprise a system control panel and a load control panel. In an implementation, system 400 may comprise one system control panel and one or more load control panels. A system control panel may be included with a DC system controller enclosure or comprise a stand-alone device. A system control panel may receive updates and send messages over feedback path 445, which may comprise a power line communication link, for example. Power line communication links may be utilized to control loads, display pertinent system information and provide telemetry and control information back to a system control panel. Software configuration may change displayed information on the system control panel to provide information regarding the following via a display: instantaneous power usage; daily solar or wind power generated; battery state of charge and time remaining at current load; grid power consumed; current state of loads and on\off switch for each; unit serial number, configuration and provisioned state; graphic profile pattern of solar production; and graphic profile of battery charge profile.

In another implementation, power distribution 420 may include more than one bus to receive and distribute electrical power. For example, a first bus may receive electrical power from one or more PV cells (e.g., solar panels) 410 or one or more batteries 412. A second bus may receive electrical power from a grid or utility system 414. In a particular implementation, one bus may be selectively connected, via a first set of switches, to a first set of loads in 440 and another bus may be selectively connected, via a second set of switches, to a second set of loads in 440. In such an approach of multiple buses, particular types of loads may be associated with particular types of electrical power. For example, a first bus to receive power from a grid may be associated with loads relying on power night and day (e.g., even while PV cells may not generate power). On the other hand, a second bus to receive power from PV cells may be associated with loads that operate usefully but somewhat extraneously, to utilize "excess" power generated by PV cells. For example, in the middle of a sunny, hot day, PV cells 410 may generate more than enough power to operate a number of loads. In such a case, loads comprising pumps or fans (e.g., motors) may be used to circulate air in a building to help cool the building. This may be one of many examples of useful but extraneous power usage.

Above, the word "excess" used in the term "excess power generated by PV cells" may imply a number of cases. In one case, for example, PV cells may generate power in excess of power demands by loads 440. Such a situation may tend to increase a voltage of a bus of 420 above an MPP. Accordingly, it may be useful to provide power to batteries 412 or to grid 414 for any of at least two reasons. First, providing power from a bus may help to lower a voltage of the bus towards (or just below) an MPP. Second, providing power from a bus may comprise a technique for storing electrical power (via batteries 412) for later utilization or for generating revenue by selling electrical power to a utility (via grid 414). Double-ended arrows between batteries 412 and power distribution 420 and between grid power 414 and power distribution 420 indicate that a bus, or buses, in power distribution 420 may provide electrical power batteries 412 or grid 414, as explained above. Of course, such details of system 400 are merely examples, and claimed subject matter is not so limited.

Figure 5:
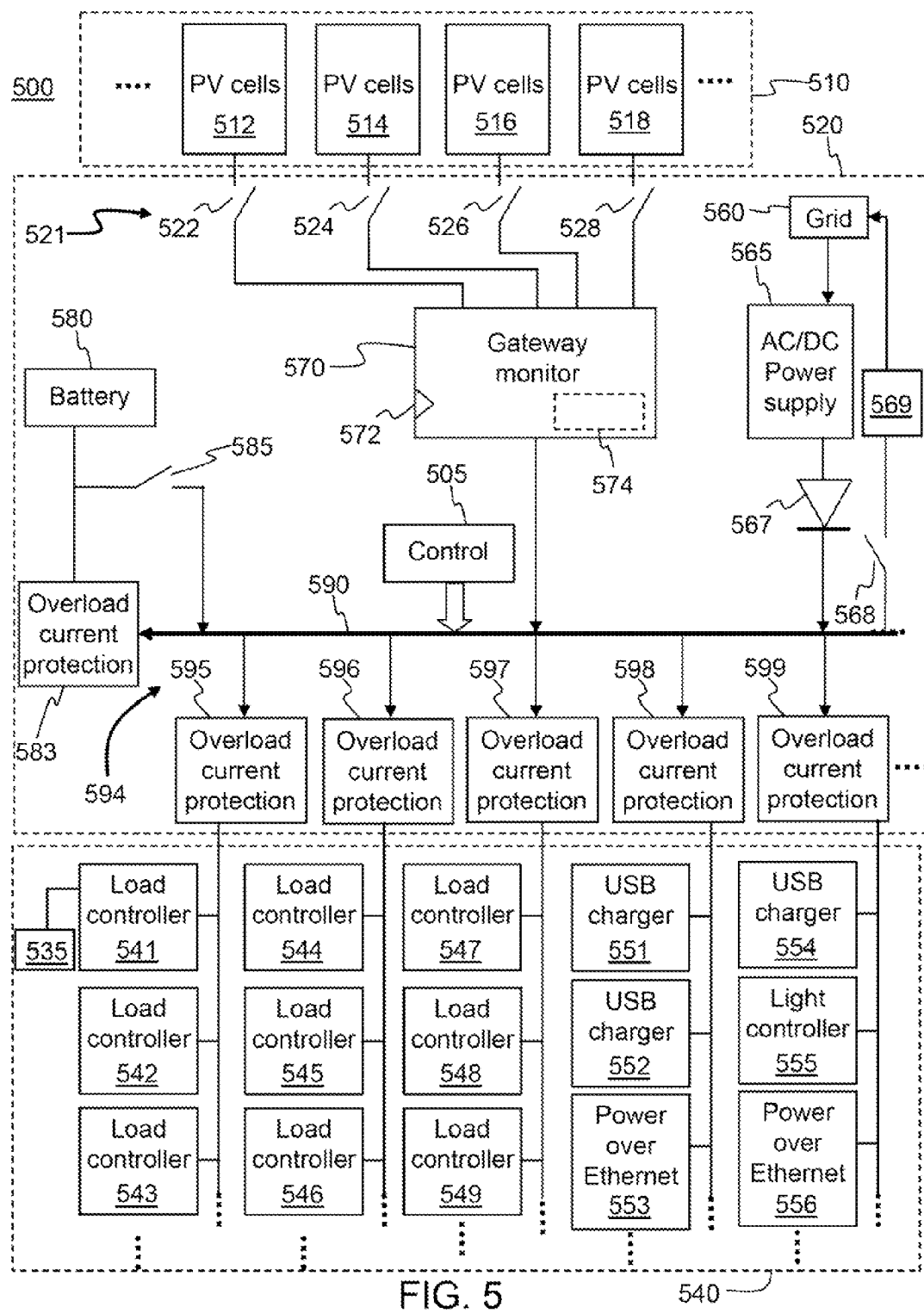
FIG. 5 is a schematic diagram illustrating a system for distributing power, including generated solar power, to device loads, according to an embodiment.

FIG. 5 is a schematic diagram illustrating a system 500 for distributing power, including generated solar power, to device loads, according to an embodiment. A system such as 500 may maintain low voltage solar power (e.g., generated by PV panels) at low voltage, which may allow for the solar power to be more effectively utilized in electronic products by avoiding a process of transforming low PV voltages to high voltage and back to low voltages for low voltage loads. System 500 may manage low voltage loads so as to more efficiently utilize generated solar power. System 500 may comprise solar power generators 510, including one or more PV cells 512, 514, 516, and 518, for example. System 500 may further comprise power distribution 520 to selectively receive electrical power from generators 510 and provide at least a portion of this power to a number of loads in a load block 540. Though in this particular embodiment system 500 is described as a "system", any portion thereof may also be called or considered a "system", and claimed subject matter is not limited in this respect.

Load block 540 may comprise a plurality of low voltage loads that may or may not be at least partially operable via load controllers (e.g., "sub-controllers, as described below). For example, low voltage loads may comprise computer workstation\server power supplies, notebook computers. Ethernet switches or routers, VOIP telephony, mobile phone chargers, battery chargers, resistive heaters, fans, HVAC control, gaming systems, digital video recorders, alarm systems. CCTV, or audio systems. For example, load 535 may comprise one or more individual lighting, or motor loads at least partially operable by control 505 or load controller 541. Similarly, individual load controllers 542 through 549 may respectively at least partially operate one or more loads comprising lighting, motor, or other types of low voltage loads. Though loads such as 535 are not schematically shown in FIG. 5, it is to be understood that individual controllers 541 through 549 may operate on, and be associated with, their respective loads. Also, the number of load controllers or branches shown in the embodiment of FIG. 5 is merely an example, and claimed subject matter is not limited in this respect. As described in further detail below, in one implementation, load controllers 541 through 549 may operate based, at least in part, on user input via a user interface (e.g., 1124 or 1126, shown in FIG.

11), such as a touch screen, for example. A load controller may comprise: a simple wall switch similar to common light switches; an enhanced touch screen controller that utilizes an area of the touch screen to turn on, off, or dim a light or fan; an enhanced touch screen that utilizes gesturing; or a Web-interface for computers and tablets. For example, a user may turn on or off a light via a hard or soft switch on a wall, via Bluetooth from a smartphone, or using voice commands, just to name a few examples. In another implementation, load controllers 541 through 549 may operate based, at least in part, on timers, detectors (e.g., motion detectors or heat sensors) to detect whether people are in a particular room. For example, it may be desirable to turn off lights while no people are in a room. In yet another example, at least partial control of a building's loads may be initiated at one or more load controllers 541 through 549 comprising wall-mounted information-and-control panels. In still another example, at least partial control of a building's loads may be initiated via load controllers 541 through 549 based, at least in part, on an Intranet or Internet interface or smart phone application.

Load block 540 may also comprise a plurality of loads such as USB chargers 551, 552, and 554, power-over-Ethernet 553, 556, and a lighting load(s) (not shown) that may or may not be at least partially operable via a load controller 555. Though there are shown particular numbers of USB chargers, power-over-Ethernet blocks, and light controllers or branches in the embodiment of FIG. 5, such numbers are merely examples, and claimed subject matter is not limited in this respect. USB chargers or power-over-Ethernet blocks may comprise examples of loads that may operate substantially all the time, as opposed to lighting loads that may often be turned off or on throughout as day. In one embodiment, there may be consideration of priority for providing power from bus 590 to various loads in 540. For example, providing power from bus 590 to power-over-Ethernet 553 may have priority over providing power from bus 590 to lighting loads via light controller 555. This may be the case, for example, for an Internet business, where losing power to computers or peripherals may be highly undesirable. Meanwhile, lighting, or other loads such as, for example, thus or pumps, may have relatively low priority, since non-operation of such loads may be less important than non-operation of computers. Considering priority for loads may be beneficial in that PV cells in 510 may not be a reliable source of power for bus 590, due to night times or adverse weather. On the other hand, grid 560 may not be a reliable source of power for bus 590 in some geographic areas where a utility infrastructure is somewhat prone to occasional failure.

Power distribution 520 may include a number of switches 522, 524, 526, 528, and so on, collectively referred to as switches 521, to selectively connect or disconnect PV cells 512, 514, 516, and 518, respectively. For example, switch 522 may be closed to allow electrical power generated by PV cell 512 to flow into distribution 520. On the other hand, switch 522 may be open to prevent electrical power generated by PV cell 512 from flowing into distribution 520. Switches 521 may comprise metal-oxide semiconductor field effect transistors (MOSFETs), or any of a number of other types of switches, such as hi-polar transistors or insulated gate bi-polar transistors (IGBTs). A gateway monitor 570 may selectively open or close switches 521.

Process 700, described in detail below, may involve electronic circuitry or a processor such as gateway monitor 570, for example. Gateway monitor 570 may comprise electronic circuitry or a processor to monitor electrical current or voltage provided by individual PV cells 512, 514, 516, and 518. For example, current provided by each of the PV cells in 510 may be detected, measured, or monitored by gateway monitor 570, which may also have ground fault detection and interrupt (GFDI) capability. Accordingly, gateway monitor 570 may detect a presence of a short circuit in any PV cells or other solar-power generators in 510. Upon or after detecting such a short circuit, gateway monitor 570 may operate switches 521 to disconnect (e.g., open switch) PV cells in 510 from distribution 520. For example, gateway 570 may open switch 526 to disconnect or otherwise isolate PV cells 516 from distribution 520. Such an action may also disconnect or otherwise isolate PV cells 516 from other PV cells 512, 514, 518, and so on. Such disconnection or isolation may be desirable to avoid possible damage to any portion of system 500 by excessive currents, for example. In one implementation, gateway monitor 570 may comprise a memory 574 to store or maintain a history of values of current or voltage of individual PV cells in 510 indexed with respect to date, time, weather (e.g., which may affect PV cells' performance), or other parameters. In another implementation, gateway monitor 570 may include a clock, and electronic circuitry to connect or disconnect PV cells in 510 from gateway monitor 570, via switches 521, in response, at least in part, to an output signal of such a clock. For example, PV cells may be disconnected from distribution 520 at night and reconnected in the morning.

In an implementation gateway monitor 570 may include one or more input ports 572 to receive information comprising electronic signals representative of date, time (e.g., from an external clock), weather conditions, or other parameters, for example. Gateway monitor 570 may include a processor (not shown) to execute code for any of a number of applications. For example, information maintained in a memory or received via input port(s) 572 may be used in an application to determine histories of efficiencies or other parameters of performance of PV cells in 510 or whether any particular PV cells of a solar panel have been problematic by demonstrating relatively low efficiency or experiencing ground faults. If so, for example, gateway monitor 570 may operate switches 521 based, at least in part, on information received via input port(s) 572. Accordingly, gateway monitor 570 may operate switches 521 to disconnect any of PV cells 510 from distribution 520. Or gateway monitor 570 may provide an indication to a user or other personnel that service of a particular solar panel or PV cells in 510 may be desirable, though claimed subject matter is not so limited.

In one implementation, electronic circuitry of gateway monitor 570 may respond, at least in part, to a state (e.g., position) of switches in an electrical switch shut-off box, such as a Knox-Box®. Such a shut-off box may be located outside of a building on a rooftop, for example, and may be accessible to emergency services personnel or building managers. For example, if a user (e.g., responding to an emergency) desires to bypass at least a portion of functions of gateway monitor 570, the user may access a shut-off box and operate one or more switches to disconnect any of PV cells in 510. Of course, such a description of operation of a switch shut-off box is merely an example, and claimed subject matter is not so limited.

Electrical power generated by PV cells in 510 may be provided to bus 590 via gateway monitor 570. For example, gateway monitor 570 may operate switches 521 to provide electrical power generated by PV cells in 510 to bus 590 or to prevent such power from reaching bus 590. In addition to receiving power from PV cells in 510, bus 590 may also receive power from grid 560 via power supply 565, which may comprise an AC to DC converter that reduces relatively high (e.g., 110 or 220 volts) power to low voltage (e.g., about 28.0 volts). For example, if sufficient power is not available from PV cells in 510, then power from grid 560 may be seamlessly engaged to provide power to bus 590. In further addition to receiving power from PV cells in 510, bus 590 may also receive power from battery 580 via switch 585. Battery 580 may comprise one or more batteries. For example, if sufficient power is not available from PV cells in 510 or grid 560, then battery power may be seamlessly engaged to provide power to bus 590.

Electrical power present on bus 590 may be provided to any number or combination of entities, including battery 580, grid 560, or any number of loads in load block 540. In a particular implementation, power on bus 590 may be provided to battery 580 via a switching device, which may comprise an overload current protection (OCP) device 583. For example, device 583 may comprise one or more components that provide protection from excessive electrical current while functioning as a switch. Such a switch of device 583, for example, may open in response to excessive currents that device 583 may detect. In another example, a switch of device 583 may be selectively opened or closed in response to control circuitry indicated by block 505. Such control circuitry may be similar to that of controller 430, described above. For example, receiving and providing electrical power to and from bus 590 may be at least partially controlled by control 505, which may comprise a processor, discrete logic circuitry, or any combination thereof. In one implementation, control 505 may receive information regarding a state of loads in load block 540. In another implementation, control 505 may receive information regarding, a state of at least a portion of bus 590. For example, control 505 may receive information regarding positions of switches operating on flow of electrical power from bus 590 to loads in 540 or from power sources in 510, battery 580, or grid 560 to bus 590. In another example, a state of bus 590 may comprise a voltage of bus 590. Accordingly, control 505 may receive information regarding a voltage on bus 590 or by how much such voltage compares to an MPP of 1N cells (e.g., 512, 514, and so on) in 510. In such a case, for example, control 505 may operate one or more switches to adjust an amount of electrical power flow from bus 590 to loads in 540. Similarly, control 505 may operate one or more switches to adjust an amount of electrical power flow to bus 590 from PV cells in 510, battery 580, or from grid 560. For example, if a voltage on bus 590 is greater than an MPP, then control 505 may operate a number of switches to increase electrical power flow to loads in 540 with intent, at least in part, to lower the voltage on bus 590.

Electrical power present on bus 590 may also be provided to grid 560 via a switch 568 and inverter 569. For example, if more than enough power is generated by PV cells in 510, with respect to demand for power by loads, then "excess" power may be provided to a utility's grid 560 from bus 590. In another example, if a voltage of bus 590 exceeds MPP by a threshold margin, then power may be provided to a utility's grid 560 from bus 590 so as to lower the voltage to be at or relatively close to MPP. Switch 568 may be selectively opened or closed in response to control 505, which may determine whether "excess" power is available on bus 590, or whether a voltage of bus 590 is higher than MPP, so as to provide such power (or a portion thereof) to grid 560, for example.

In an embodiment, electrical power present on bus 590 may be provided to any number of loads in 540 via a number of switching device 595, 595, 597, 598, 599, and so on, collectively called "594". For example, if a voltage of bus 590 exceeds MPP by a threshold margin, then any of a combination of switches 594 may be selectively opened or closed in response to control 505 to reduce the voltage of bus 590 by increasing a net transfer of power to loads in 540. On the other hand, if a voltage of bus 590 is less than MPP by a threshold margin, then any of a combination of switches 594 may be selectively opened or closed to increase the voltage of bus 590 by decreasing a net transfer of power to loads in 540. Here, "net transfer" implies that some switches may be opened or other switches closed so that power is transferred from bus 590 to a combination of loads in 540 so that an overall outcome is either an increase or decrease in voltage on bus 590. Any or all of switches 594 may provide overload current protection to electrical loads. Of course, such details of system 500 are merely examples, and claimed subject matter is not so limited.

Figure 6:
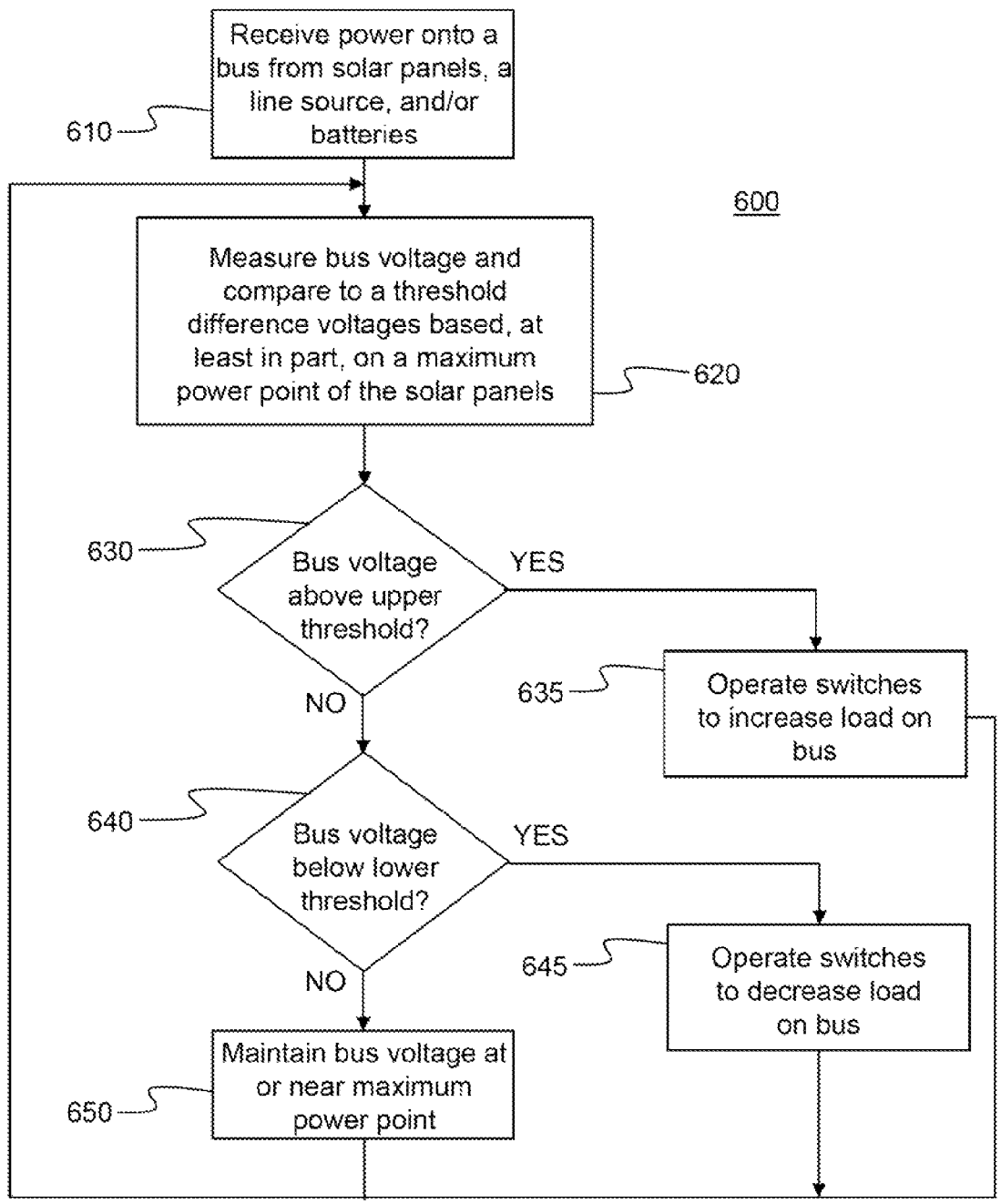
FIG. 6 is a flow diagram of a process for maintaining a bus voltage at or near a maximum power point of solar panels, according to an embodiment.

FIG. 6 is a flow diagram of a process 600 for maintaining a bus voltage at or near a maximum power point of solar panels, according to an embodiment. For example, an amount of electrical power provided to any of a plurality of electrical loads may be increased in response to a voltage deviation on bus 590 being positive with respect to an MPP of PV cells in 510. On the other hand, an amount of electrical power provided to any of a plurality of electrical loads may be decreased in response to a voltage deviation on bus 590 being negative with respect to an MPP. At block 610, a bus such as 590, for example, may receive power from solar panels, which may comprise PV cells in 510, a line source, such as grid 560, or batteries, such as 580. At block 620, a voltage of a bus such as 590 may be measured. Such measured voltage may be compared to threshold voltages based, at least in part, on the MPP of PV cells. Such threshold voltages may comprise an upper threshold voltage and a lower threshold voltage. For a particular example, if MPP comprises a value of 28.0 volts, then an upper threshold voltage may comprise a value of 32.0 volts and a lower threshold voltage may comprise a value of 26.0 volts (e.g., upper and lower threshold voltages need not be symmetrical about MPP).

At block 630, a determination may be made as to whether the voltage on a bus is greater than an upper threshold voltage. Such a determination may be made by control 505, for example, though claimed subject matter is not so limited. If so, then process 600 may proceed to block 635, where switches may be operated (e.g., by control 505) to increase loading on the bus. The intent here, for example, is to lower bus voltage toward MPP. Process 600 may then return to block 620, where bus voltage may again be measured or monitored.

If however, the voltage on the bus is not greater than an upper threshold voltage, then process 600 may proceed to block 640, where a determination may be made as to whether the voltage on the bus is less than a lower threshold voltage. Such a determination may be made by control 505, for example, though claimed subject matter is not so limited. If so, then process 600 may proceed to block 645, where switches may be operated (e.g., by control 505) to decrease loading on the bus. The intent here, for example, is to increase bus voltage toward MPP. Process 600 may then return to block 620, where bus voltage may again be measured or monitored.

If, however, the voltage on the bus is not less than a lower threshold voltage, then process 600 may proceed to block 650, where a bus voltage may be maintained at or near MPP. Process 600 may return to block 620, where bus voltage may again be measured or monitored. Of course, such details of process 600 are merely examples, and claimed subject matter is not so limited.

Figure 7:
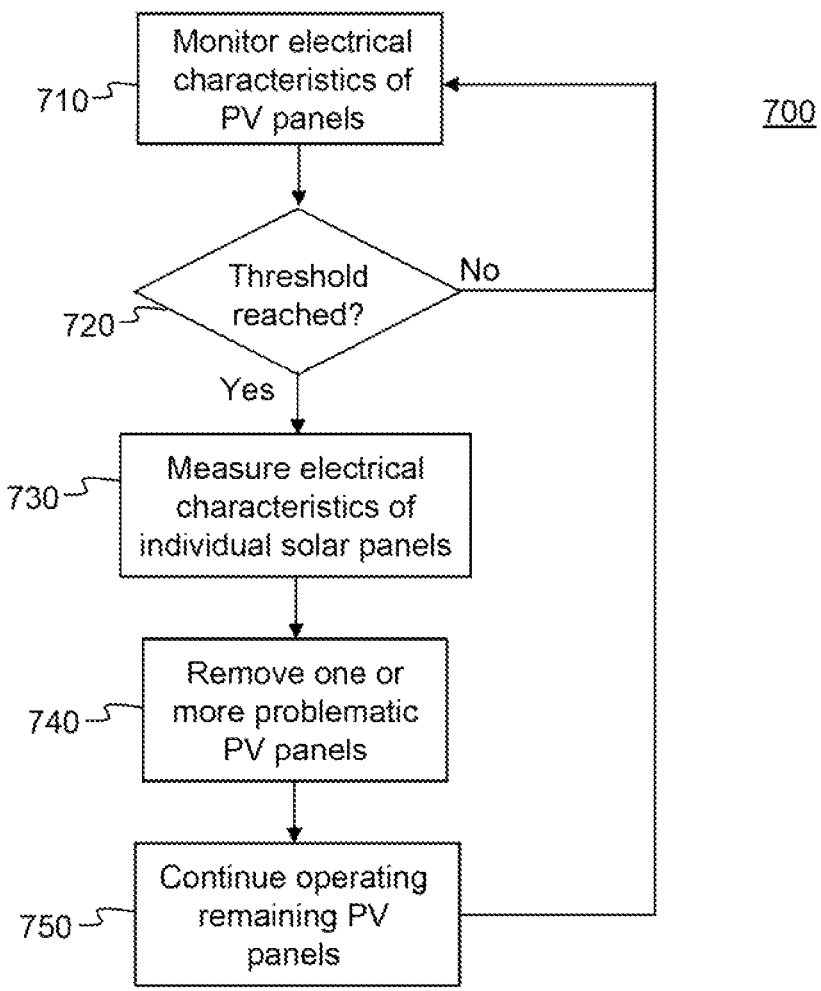
FIG. 7 is a flow diagram of a process for monitoring performance of a plurality of solar panels, according to an embodiment.

FIG. 7 is a flow diagram of a process 700 for monitoring performance of a plurality of solar panels, according to an embodiment. For example, such monitoring may be performed by an entity such as gateway monitor 570, described above. At block 710, current provided by individual PV cells or solar panels, such as in 510, for example, may be detected, measured, or monitored by gateway monitor 570, which may also have ground fault detection and interrupt (GFDI) capability. Gateway monitor 570 may detect a presence of a ground fault or short circuit in any PV cells or other solar-power generators in 510. Accordingly, at block 720, a determination may be made as to whether a threshold voltage or current is measured for power generated by the individual PV cells or solar panels. If so, then process 700 may proceed to block 730, where electrical characteristics of individual PV cells or solar panels may be measured. Such measurements may be performed, for example, in a round-robin fashion, so that electrical characteristics of one solar panel may be measured, then electrical characteristics of another solar panel may be measured, and so on. In this way, an individual problematic solar panel (which may comprise a faulty PV cell, for example) may be identified. Electrical characteristics of such a problematic solar panel may comprise abnormal voltage or current. For example, relatively low voltage and high current may indicate a short circuit. In another example, relatively low current may indicate an open circuit or otherwise defective solar panel. At block 740, upon or after detecting such a problematic solar panel, gateway monitor 570 may operate switches (e.g., 521) to disconnect (e.g., open switch) the solar panel from other portions of a system. Such disconnection or isolation may be desirable to avoid possible damage to any portion of the system by excessive currents, for example.

For an illustrative example of a particular implementation, if a measured ground fault current exceeds 1.0 amperes then all panels may be disconnected. If ground fault current is between 0.1 amperes and 1.0 amperes then a single panel may be disconnected from other portions of the system. Removing a single panel at a time may or may not lead to a fault current change. If a substantial change in ground fault current is detected, then the just-disconnected panel may be considered to be responsible for at least a portion of the ground fault current. In such a case, this panel may remain disconnected from other portions of the system. On the other hand, if no substantial change in ground fault current is detected, then the just-disconnected panel may be reconnected to the system and then monitored again for consistency over time, for example. A subsequent panel may then be disconnected and ground fault current may be measured again for a possible change in ground fault current. As before, if a substantial change in ground fault current is detected, then the just-disconnected panel may be considered to be responsible for at least a portion of the ground fault current. In such a case, this panel may remain disconnected from other portions of the system. On the other hand, as before, if no substantial change in ground fault current is detected, then the just-disconnected panel may be reconnected to the system and then monitored again for consistency over time, for example. Another subsequent panel may then be disconnected and ground fault current may be measured again for a possible change in ground fault current. Such a process may repeat in a round-robin fashion for all panels in 510, for example. Such a process may allow all panels except the panel-under-test to provide generated electricity to the system. A memory, such as in gateway monitor 570 for example, may record ground fault current measurements during the round-robin process. Such measurements may be useful in the future for discovering possible performance patterns of the panels and thus determining problematic panels. From block 750, process 700 may return to block 710 while operating remaining solar panels. Of course, such details of process 700 are merely examples, and claimed subject matter is not so limited.

Figure 8:
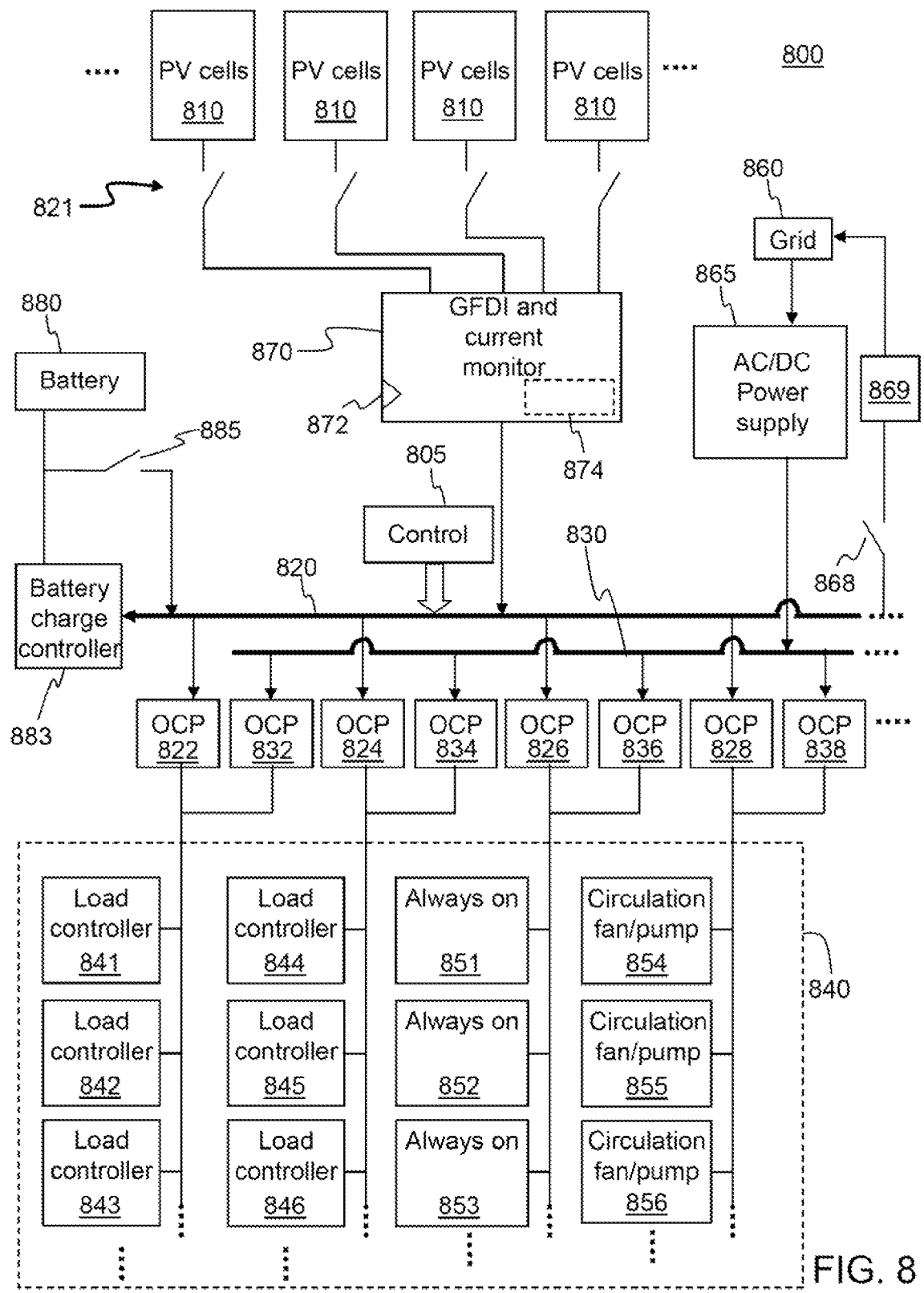
FIG. 8 is a schematic diagram illustrating a system for distributing power, including generated solar power, to device loads, according to another embodiment.

FIG. 8 is a schematic diagram illustrating a system 800 for distributing power, including generated solar power, to device loads, according to another embodiment. A system such as 800 may maintain low voltage solar power (e.g., generated by PV panels) at low voltage, which may allow for the solar power to be more effectively utilized, in electronic, products by avoiding a process of transforming, low PV voltages to high voltage and back to low voltages for low voltage loads. System 800 may manage low voltage loads so as to more efficiently utilize generated solar power. System 800 may be similar to system 500 described above, except for differences in bus topology. System 800 may comprise solar power generators 810 and a number of loads in a load block 840. Though in this particular embodiment system 800 is described as a "system", any portion thereof may also be called or considered a "system", and claimed subject matter is not limited in this respect.

Load block 840 may comprise a plurality of low voltage loads that may or may not be at least partially operable via light controllers 841-846 (e.g., "sub-controllers, as described below). Other loads may be normally continuously operated, such as "always on" 851-853. Still other loads may comprise circulation fan/pump 854-856. For example, always on loads may comprise computer workstation\server power supplies, Ethernet switches or routers, VOIP telephony notebook computers, or alarm systems, whereas other loads may comprise mobile phone chargers, battery chargers, resistive heaters, fans, HVAC control, gaming systems, digital video recorders, CCTV, or audio systems, though claimed subject matter is not so limited. Though individual loads are not schematically shown in FIG. 8, it is to be understood that individual controllers may operate on, and be associated with, their respective loads. Also, the number of load controllers or branches shown in the embodiment of FIG. 8 is merely an example, and claimed subject matter is not limited in this respect.

A power distribution portion of system 800 may include a number of switches 821 to selectively connect or disconnect PV cells 810, respectively. Switches 821 may comprise metal-oxide semiconductor field effect transistors (MOSFETs), or any of a number of other types of switches, such as hi-polar transistors or insulated gate bi-polar transistors (IG-BTs). A gateway monitor 870 may selectively open or close switches 821.

Process 700, described in detail below, may involve electronic circuitry or a processor such as gateway monitor 870, for example. Gateway monitor 870 may comprise electronic circuitry or a processor to monitor electrical current or voltage provided by individual PV cells 810. For example, current provided by individual PV cells 810 may be detected, measured, or monitored by gateway monitor 870, which may also have ground fault detection and interrupt (GFDI) capability. Accordingly, gateway monitor 870 may detect a presence of a short circuit in any PV cells or other solar-power generators 810. Upon or after detecting such a short circuit, gateway monitor 870 may operate switches 821 to disconnect (e.g., open switch) PV cells 810 from 870. In one implementation, gateway monitor 870 may comprise a memory 874 to store or maintain a history of values of current or voltage of individual PV cells 810 indexed with respect to date, time, weather (e.g., which may affect RV cells' performance), or other parameters. In another implementation, gateway monitor 870 may include a clock and electronic circuitry to connect or disconnect PV cells 810 from gateway monitor 870, via switches 821, in response, at least in part, to an output signal of such a clock.

In an implementation, gateway monitor 870 may include one or more input ports 872 to receive information comprising electronic signals representative of date, time (e.g., from an external clock), weather conditions, or other parameters, for example. Gateway monitor 870 may include a processor (not shown) to execute code for any of a number of applications. For example, information maintained in a memory or received via input port(s) 872 may be used in an application to determine histories of efficiencies or other parameters of performance of PV cells 810 or whether any particular PV cells of a solar panel have been problematic by demonstrating relatively low efficiency or experiencing ground faults. If so, for example, gateway monitor 870 may operate switches 821 based, at least in part, on information received via input port(s) 872. Accordingly, gateway monitor 870 may operate switches 821 to disconnect any of PV cells 810 from 870. Or gateway monitor 870 may provide an indication to a user or other personnel that service of a particular solar panel or PV cells 810 may be desirable, though claimed subject matter is not so limited.

In one implementation, electronic circuitry of gateway monitor 870 may respond, at least in part, to a state (e.g., position) of switches in an electrical switch shut-off box, such as a Knox-Box®. Such a shut-off box may be located outside of a building on a rooftop, for example, and may be accessible to emergency services personnel or building managers. For example, if a user (e.g., responding to an emergency) desires to bypass at least a portion of functions of gateway monitor 870, the user may access a shut-off box and operate one or more switches to disconnect any of PV cells 810. Of course, such a description of operation of a switch shut-off box is merely an example, and claimed subject matter is not so limited.

Electrical power generated by PV cells 810 may be provided to bus 820 via gateway monitor 870. For example, gateway monitor 870 may operate switches 821 to provide electrical power generated by PV cells 810 to bus 820 or to prevent such power from reaching, bus 820. Bus 830 may receive power from grid 860 via power supply 805, which may comprise an AC to DC converter that reduces relatively high (e.g., 110 or 220 volts) power to low voltage (e.g., about 28.0 volts). For example, if sufficient power is not available from PV cells 810, then power from grid 860 may be seamlessly engaged to provide power to bus 830, in further addition to receiving power from PV cells 810, bus 820 may also receive power from battery 880 via switch 885. Battery 880 may comprise one or more batteries. For example, if sufficient power is not available from PV cells 810 or grid 860, then battery power may be seamlessly engaged to provide power to bus 820.

Electrical power present on bus 820 may be provided to any number or combination of entities, including battery 880 or any number of loads in load block 840. In a particular implementation, power on bus 820 may be provided to battery 880 via a switching device, which may comprise a battery charge controller 883 that may include an overload current protection (OCP) device. For example, device 883 may comprise one or more components that provide protection from excessive electrical current while functioning as a switch. Such a switch of device 883, for example, may open in response to excessive currents that device 883 may detect. In another example, a switch of device 883 may be selectively opened or closed in response to control circuitry indicated by block 805. Such control circuitry may be similar to that of controller 430, described above. For example, receiving and providing electrical power to and from buses 820 or 830 may be at least partially controlled by control 805, which may comprise a processor, discrete logic circuitry, or any combination thereof. In one implementation, control 805 may receive information regarding a state of loads in load block 840, in another implementation, control 805 may receive information regarding a state of at least a portion of bus 820 or 830. For example, control 805 may receive information regarding positions of switches operating on flow of electrical power from buses 820 or 830 to loads in 840; from PV cells 810 and battery 880 to bus 820; or from grid 860 to bus 830. In another example, a state of bus 820 may comprise a voltage of bus 820. Accordingly, control 805 may receive information regarding, a voltage on bus 820 or by how much such voltage compares to an MPP of PV cells 810. In such a case, for example, control 805 may operate one or more switches to adjust an amount of electrical power flow from bus 820 to loads in 840. Similarly, control 805 may operate one or more switches to adjust an amount of electrical power flow to bus 820 from PV cells 810 or battery 880. For example, if a voltage on bus 820 is greater than an MPP, then control 805 may operate a number of switches to increase electrical power flow to loads in 840 with intent, at least in part, to lower the voltage on bus 820.

Electrical power present on bus 820 may also be provided to grid 860 via a switch 868 and inverter 869. For example, if more than enough power is generated by PV cells 810, with respect to demand for power by loads, then "excess" power may be provided to a utility's grid 860 from bus 820. In another example, if a voltage of bus 820 exceeds MPP by a threshold margin, then power may be provided to a utility's grid 860 from bus 820 so as to lower the voltage to be at or relatively close to MPP. Switch 868 may be selectively opened or closed in response to control 805, which may determine whether "excess" power is available on bus 820, or whether a voltage of bus 820 is higher than MPP, so as to provide such power (or a portion thereof) to grid 860, for example.

In an embodiment, electrical power present on bus 820 may be provided to any number of loads in 840 via a number of switching device 822, 824, 826, 828, and so on. On the other hand, electrical power present on bus 830 may be provided to any number of loads in 840 via a number of switching device 832, 834, 836, 838, and so on. Bus 830 may provide grid power, which may be more reliable than solar power, to "always on" loads, for example. However, solar power from bus 820 may also be available to such loads via switches 822, 824, 826, 828.

If a voltage on bus 820 exceeds MPP by a threshold margin, then any of a combination of switches 822, 824, 826, 828 may be selectively opened or closed in response to control 805 to reduce the voltage on bus 820 by increasing a net transfer of power to loads in 840. On the other hand, if a voltage of bus 820 is less than MPP by a threshold margin, then any of a combination of switches 822, 824, 826, 828 may be selectively opened or closed to increase the voltage of bus 820 by decreasing a net transfer of power to loads in 840. Here, "net transfer" implies that some switches may be opened or other switches closed so that power is transferred from bus 820 to a combination of loads in 840 so that an overall outcome is either an increase or decrease in voltage on bus 820. Any or all of switches 822, 824, 826, 828, 832, 834, 836, 838 may provide overload current protection to electrical loads. Of course, such details of system 800 are merely examples, and claimed subject matter is not so limited.

Figure 9:
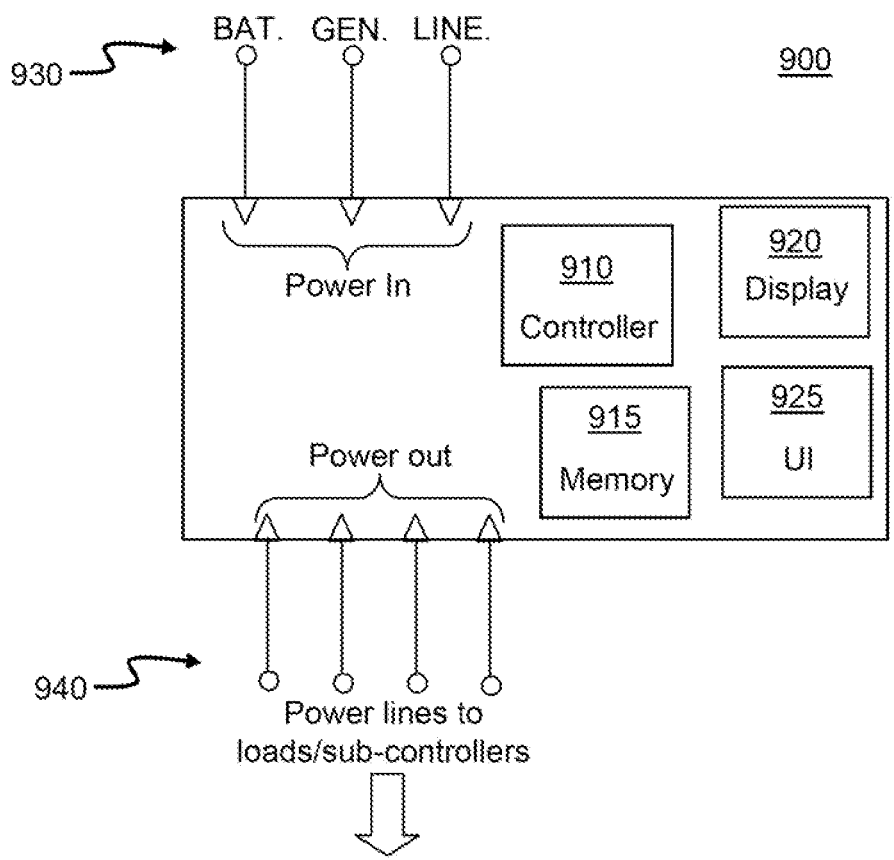
FIG. 9 is a schematic diagram illustrating a device for receiving or distributing electrical power to device loads, according to an embodiment.
Figure 10:
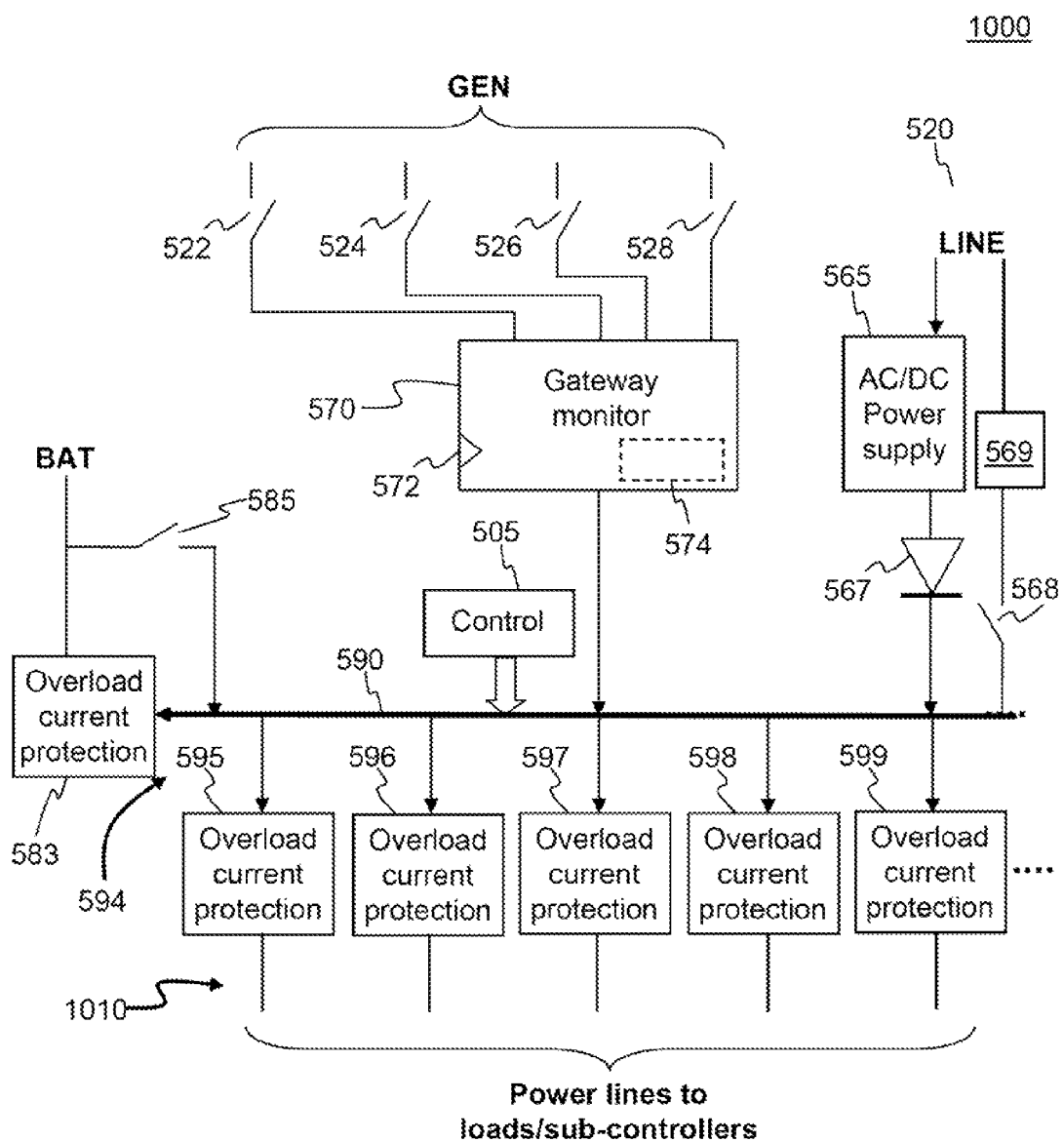
FIG. 10 shows a power distribution portion of a device, according to an embodiment.

FIG. 9 is a schematic diagram illustrating a device 900 for receiving or distributing low-voltage power to low-voltage device loads, according to an embodiment. Such a device, for example, may include at least a portion of power distribution 520, though claimed subject matter is not so limited. FIG. 10 shows a portion 1000 of power distribution 520 that may comprise device 900. Device 900, similar to 520 described above, may selectively receive electrical power from generators or provide to a number of loads.

In one implementation, device 900 may comprise an enclosure having a number of input and output ports 930 and 940 that are user-connectible at a location of application. For example, device 900 may be placed in a "central" location in a building where a plurality of power lines, cables, or wires from power sources or loads terminate. The power lines, cables, or wires may be connected to input and output ports of device 900. For example, wires from one or more batteries (BAT.), one or more generators (GEN.) (e.g., solar or wind), or a line source (LINE) may be connected to ports 930. In a particular implementation, LINE port may receive power from a line source or may provide power to the line source (e.g., "selling power back to the utility"). Power lines 1010 to a number of loads, which may include, sub-controllers, may be connected to ports 940. Power lines may be structurally integrated with a building, for example. Again, FIG. 10 shows some details of a particular implementation of device 900.

Device 900 may include a display 920, which may comprise a touch screen, to allow a user to visually monitor or operate various parameters or functions of device 900, as described below. Device 900 may also include a user interface, which may comprise a keyboard, switches, and so on. Depending, at least in part, on a particular implementation, 920, 925, or a combination of both may be incorporated in device 900. Device 900 may comprise a controller 910 or memory 915. For example, controller 910 may be similar to control 505, described above.

As mentioned above, device 900 may comprise at least one input port (GEN.) to receive low-voltage green-energy power; at least one input port to receive low-voltage grid power (LINE) converted from high-voltage utility electrical power, for example; and at least one port to connect to one or more batteries (BAT.). Device 900 may further comprise at least one power output port (940) through which to provide, via power lines (e.g., 1010), at least a portion of the low-voltage green-energy power, the low-voltage grid power, or electrical power from the batteries to low-voltage electrical loads; and to receive, via the power lines, an electronic signal representative of a state of operation of the low-voltage electrical loads. For example, a "state of operation" may comprise an "off" state, an "on" state, a voltage or current of operation of the loads, or a temperature of operation of the loads.

Device 900 may further comprise a bus (e.g., bus 590) to receive at least a portion of the low-voltage green-energy power, the low-voltage grid power, or the electrical power from the batteries, and to provide the low-voltage green-energy power, the low-voltage grid power, or the electrical power from the batteries to the power output port. As mentioned above, low-voltage green-energy power may comprise power generated by at least one solar panel. In such a case, device 900 may further comprise detection electronics (e.g., control 505) to detect or measure a voltage of the bus, and comparison electronics to compare the voltage with a maximum power point of the at least one solar panel. Device 900 may further comprise a controller to operate one or more switches (e.g., 594) electrically between the bus and the low-voltage electrical loads. The controller may operate the switches in response to a result of the comparing performed by the comparison electronics, for example. Low-voltage electrical loads may comprise lighting loads or motor loads, just to name a few examples.

In one implementation, device 900 operating in a building may comprise at least one input port to receive electronic signals representative of measurements of air conditions in at least a portion of the building. For example, air conditions may comprise gas concentration levels (e.g., carbon dioxide level, oxygen level), temperature, humidity, or barometric pressure.

Figure 11:
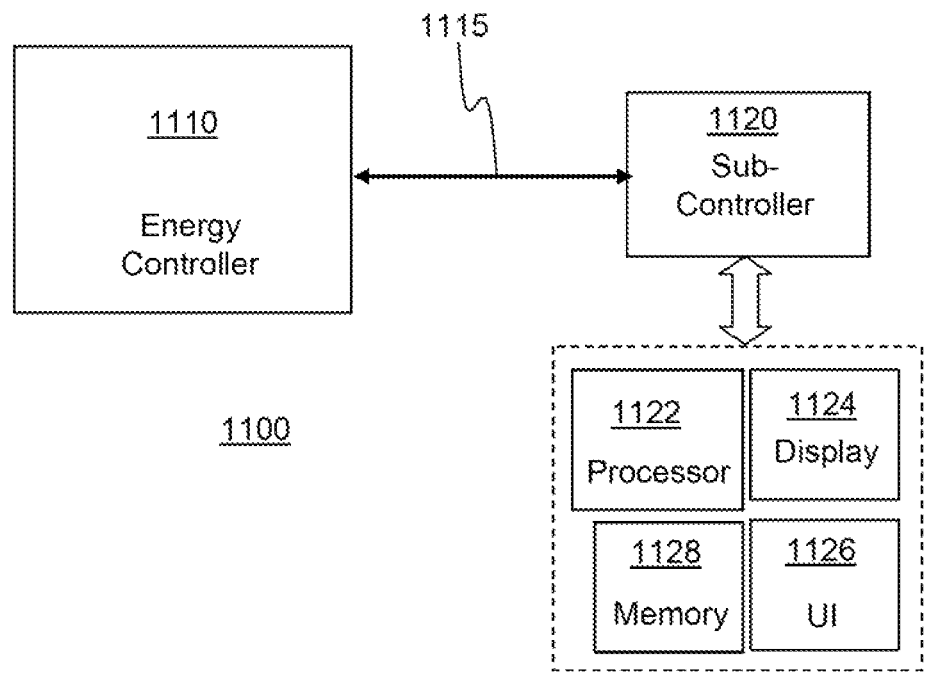
FIG. 11 is a schematic diagram illustrating a system incorporating an energy controller and a sub-controller, according to an embodiment.

FIG. 11 is a schematic diagram illustrating a system 1100 incorporating an energy controller 1110 and a sub-controller 1120, according to an embodiment. For example, energy controller 1110 may be similar to device 900 or a portion thereof, such as controller 910, though claimed subject matter is not so limited. System 1100 may include one or more sub-controllers 1120, though only one is shown in FIG. 11 for simplicity. Sub-controllers 1120 may be similar to load controllers 541-549, USB chargers 551-554, light controller 555, and Power-over-Ethernet controller 556, for example. Individual sub-controllers 1120 may include a processor 1122, a display 1124, a user interface 1126, or a memory 1128, for example. Power lines 1115 such as low-voltage power lines, may comprise one or more electrical conductors or pairs thereof, indicated by the double arrow in FIG. 11.

Energy controller 1110 may receive, via low-voltage power lines 1115, electronic signals representative of requests to change states of operation of low-voltage electrical loads that receive low-voltage power from a bus (e.g., bus 590) via the low-voltage power lines. The energy controller may compare a voltage on the bus with a maximum power point of solar panels (e.g., 510) that, at least in part, provide power to the bus. The energy controller may determine whether to change a state of at least one other load based, at least in part, on performing, such comparing. A request to change a state of operation of a low-voltage electrical load may comprise a user making a selection using sub-controller 1120 for adjusting brightness or turning lights on/off via a sub-controller, just to name a few examples. As mentioned above, an electronic signal representative of such a request may be encoded to identify a location of sub-controller 1120 generating the electronic signal. Thus a controller may identify a location of an electrical load corresponding to (e.g., which may be in a same room as) a particular sub-controller 1120 based, at least in part, on an electronic signal. For example, individual sub-controllers may have a unique identification value, which energy controller 1110 may use with a table of values that lists locations of sub-controllers corresponding to their identification values of. Such a table may be stored in a memory (e.g., memory 915) in energy controller 1110, for example.

As mentioned above, energy controller 1110 may determine whether to change a state (e.g., turn on/off or adjust) of at least one other load other than the load associated with the request received over power lines 1115. For example, one load may comprise a lighting load (e.g., 535) and the other load may comprise a motor (e.g., 535). Such a determination may be based, at least in part, on the comparing of a voltage on a bus with an MPP of solar panels. For example, a determination may be made as to whether to operate one or more switches (e.g., 594) to provide power to, or to change a state of, a load, such as a motor of a fan or air conditioner, for example. Doing so may be useful in allowing a voltage on the bus to decrease to a level closer to or substantially at MPP. Such a determination may also be based, at least in part, on air conditions (e.g., carbon dioxide level, oxygen level, temperature, humidity, or barometric pressure) in one or more rooms of a building.

In a particular implementation of a system, of which system 1100 is merely an example, power lines 1115 may comprise merely two wires per circuit or load, and may operate at a positive or negative 28 volts or 48 volts. Sub-controllers 1120 may report to energy controller 1110 an addressable load power state (e.g., on/off, or other level information regarding a system status comprising one or more of the following: present blend of power from sources (e.g., 80% solar, 15% wind, 5% battery, 0% grid), hourly or daily power production by the individual power sources, history of power production by the individual power sources, weather forecast. Bluetooth pass-though of individual rooms, and security system status, just to name a few examples. For example, in one implementation, a pass-though mode may allow Bluetooth commands to be send from a mobile device to a wall switch type control panel to a system controller. In another implementation, a Bluetooth connection may operate by reading, a status of a system controller or sensors in a wall switch control panel, though claimed subject matter is not so limited. Either sub-controllers 1120, energy controller 1110, or both may display such information (e.g., via displays 920 or 1124). Individual sub-controllers 1120 may generate an electronic signal that may be provided to energy controller 1110 via low-voltage power lines 1115, as mentioned above. Such an electronic signal may be encoded, and may be interpreted or decoded by energy controller 1110 to include information regarding a requested load change of state; a requested mode change for any of a number of a building's components (e.g., lighting, HVAC, security system); carbon dioxide, carbon monoxide, nitrogen, or oxygen sensor levels for particular rooms in the building, light levels for particular rooms; temperature levels for particular rooms; humidity levels for particular rooms; barometric pressure for particular rooms; occupancy sensors or estimated number of people for particular rooms; or Bluetooth pass-through.

In an example embodiment, energy controller 1110 may utilize this information in a number of ways. For example, a process (e.g., a Demand Control Ventilation Algorithm) may be employed to utilize excess power produced by solar or wind energy to run a variable speed DC motor to assist with heating, cooling, fresh air introduction, or building, air circulation. The variable speed nature of this load type may allow for a relatively fine granularity for loading a PV system to a desired level with respect to MPP, for example. This is in contrast to a relatively coarse step function associated with lighting loads that are switched in a non-dimming fashion (e.g., on/off). Such a process may involve prioritization of system resources or to incorporate tune-of-day operations, system knowledge planning, or setting modes of operation. Such a process may also involve using a variety of information (e.g., sensor information, and other parameters described above) to predict energy production or anticipated load demands at different phases throughout the day.

Figure 12:
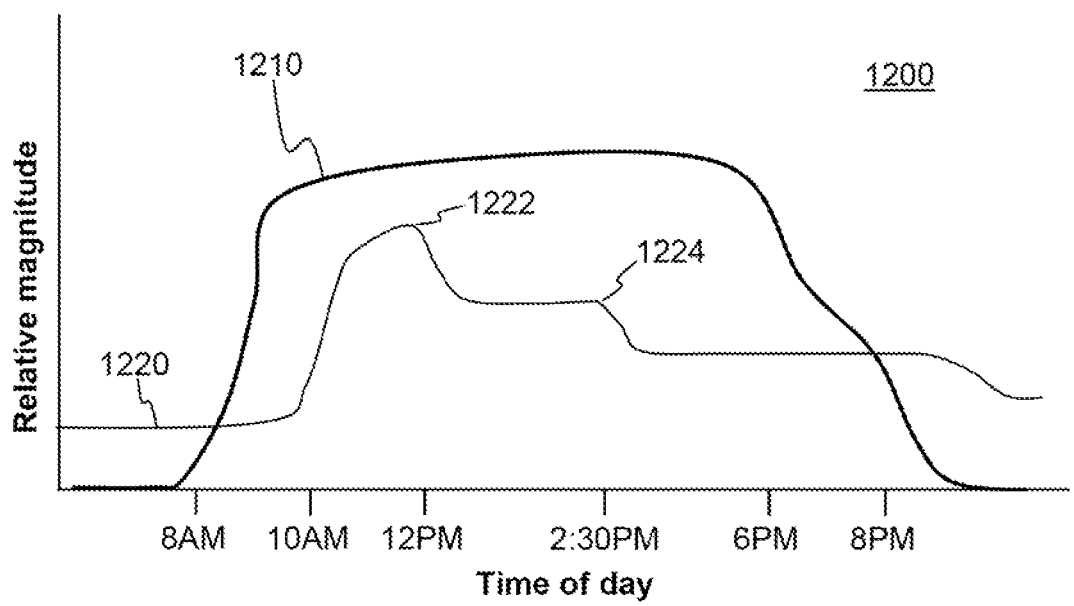
FIG. 12 is a plot of characteristics of a room in a building, according to an embodiment.

FIG. 12 is a plot 1200 of characteristics of a room in a building, according to an embodiment. This plot is over a period of a workday, though other examples of such a plot may be over varying periods, such as an hour, day, week, month, year, and so on. Curve 1210 shows a relative number of people in a room as a function of time of day. Before 8 AM, there may be no people in the room. But between about 8 AM and 10 AM, workers enter the room for a workday. Between about 5:30 PM and 9 PM, the workers leave the room.

Curve 1220 shows a relative magnitude of carbon dioxide as a function of time of day. Levels of carbon dioxide in a room may correspond to the number of people in the room. Accordingly, carbon dioxide levels may be at their lowest at the beginning of a workday. But soon after workers begin to enter the room for the day, carbon dioxide levels begin to rise, around 10 AM, for example. Carbon dioxide levels continue to rise until around noon. At this time, in this particular example, carbon dioxide levels may decrease at point 1222 due, at least in part, to introduction of fresh air by an air handling system. Fans of such a system may be switched on or their speed adjusted automatically (e.g., by energy controller 1110) based, at least in part, on time of day, temperature, barometric pressure, occupancy, and so on. At point 1224, around 2:30 PM, another decrease in carbon dioxide levels may occur due, at least in part, to another increase in power to fans of the air handling system. In this case, excess power generated by solar panels in the midday sun may be provided to these fans by energy controller 1110, which may make decisions as to if or when adjustments of air circulation are to be made. Such decisions may be based, at least in part, on availability of excess power, sources of power (e.g., availability of solar power versus utility power), level of desirability or usefulness of increased air circulation (e.g., prioritize service to rooms), and so on.

An energy controller may consider that solar output may be relatively weak early in a day and subsequently increase in a substantially linear fashion throughout the first part of the day. An energy controller may utilize solar-based power generated during the early portion of the day to charge batteries until such time as sufficient current capacity and stability exists to disengage or reduce line power (e.g., AC Power) in a stable fashion. It may be desirable to reduce usage of line power and run solely or predominantly by renewable resources (wind or solar). Battery power may be utilized to subsidize power generated by such renewable resources so that a line power source remains substantially off until such time as the battery (or batteries) no longer retains enough energy to meet "emergency power" reserve levels. At such time, a line power source may be switched on and may be used to charge the battery or increase power to a circulation fan to achieve improvement in power supply efficiency (e.g., peak efficiencies of a number of types of power supplies may be between 50% and 90% of full load). Accordingly, loading an AC to DC power supply for improved efficiency may be an objective of an energy controller.

An energy controller may utilize excess power generated at times of peak production to perform one or more of the following, depending, at least in part, on system configuration: charge batteries, chill rooms of a building using filtered outside air at night if cooling is desired, heat a water source for domestic usage or to aid building heat, or invert power from a bus to supply power back to the utility.

Figure 13:
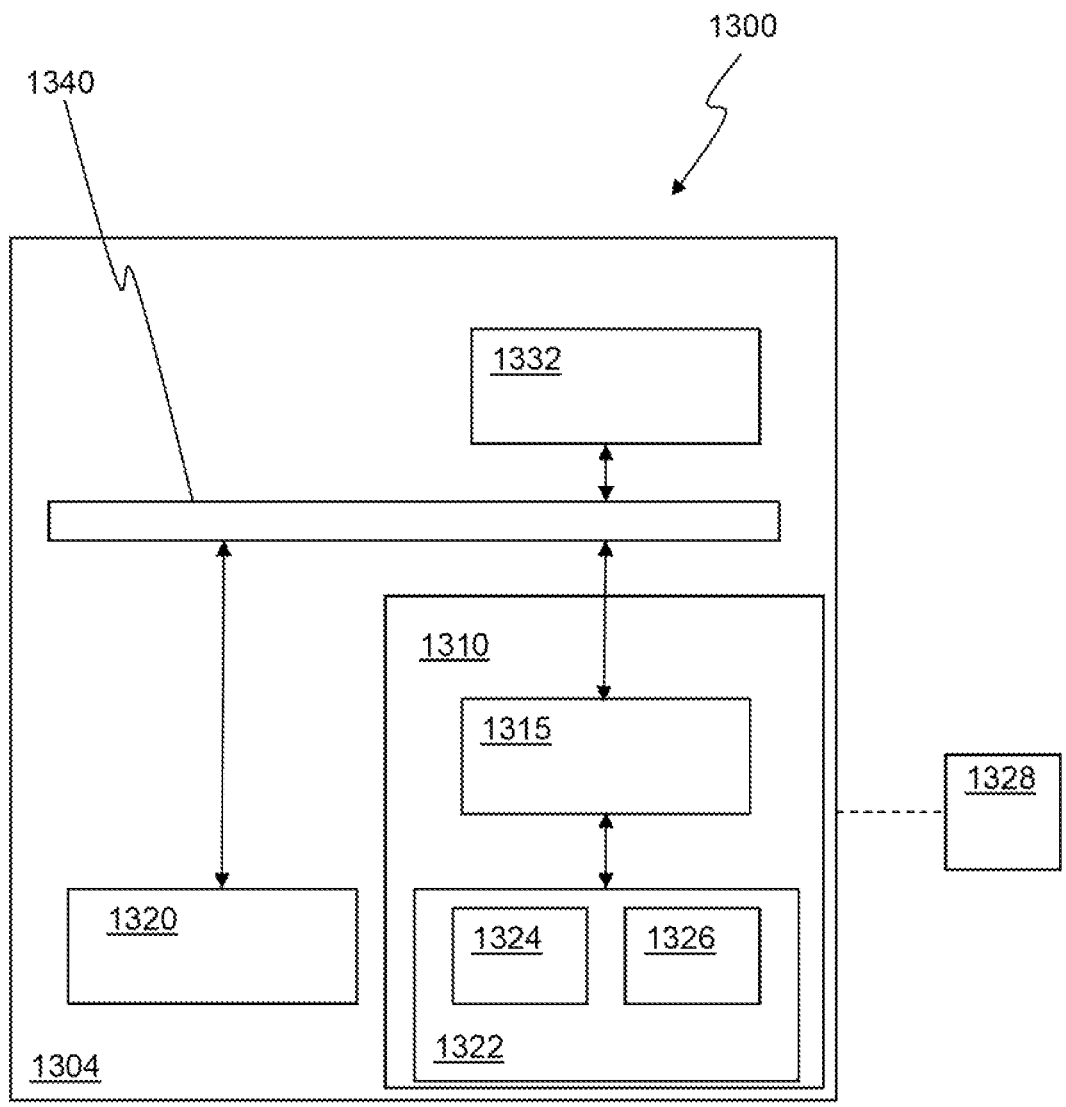
FIG. 13 is a schematic diagram illustrating an exemplary embodiment of a computing system.

FIG. 13 is a schematic diagram illustrating an embodiment of a computing system 1200. Such a computing device may comprise one or more processors, for example, to execute an application or other code. A computing device 1304 may be representative of any device, appliance, or machine that may be configurable to manage at least portions of systems, such as 500, 800, 900, or 1100, for example. In a particular implementation, computing device 1304 may be similar to gateway monitor 570, control 430 or 505, controller 910, or processor 1122, for example. By way of example but not limitation, computing device 1304 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or information storage service provider/system; or any combination thereof.

It is recognized that all or part of the various devices shown in system 1300, and the processes and methods as further described herein, such as processes 600, 700, among others, may be implemented using or otherwise including hardware, firmware, software, or any combination thereof. Thus, by way of example but not limitation, computing device 1304 may include at least one processing unit 1320 that is operatively coupled to memory 1322 through a bus 1340 and a host or memory controller 1315.

Processing unit 1320 is representative of one or more circuits configurable to perform at least a portion of an information computing procedure or process. By way of example but not limitation, processing unit 1320 may include one or more processors, controllers, microprocessors, microcontrollers, application specific integrated circuits, digital signal processors, programmable logic devices, field programmable gate arrays, and the like, or any combination thereof. Processing unit 1320 may include an operating system configured to communicate with memory controller 1315. Such an operating system may, for example, generate commands to be sent to memory controller 1315 over bus 1340. Such commands may comprise read or write commands.

In an embodiment, processing unit 1320 may comprise a controller to operate a first set of switches to selectively provide electrical power from one or more solar panels and/or a line source to a power bus (e.g., 590); and operate a second set of switches to selectively provide at least a portion of the electrical power to any of a plurality of electrical loads, wherein the first set of switches or the second set of switches may be operable to maintain electrical characteristics of the power bus substantially at or near a maximum power point of the solar panels. Such a controller may further operate the second set of switches to provide electrical power from one or more batteries to maintain electrical characteristics of the power bus substantially at or near said maximum power point. Such a controller may further operate a micro inverter or switches to the micro inverter to provide at least a portion of the electrical power to the line source.

In another embodiment, processing unit 1320 may comprise a controller to monitor electrical characteristics of a bus that receives electrical energy from photovoltaic panels, and to operate one or more switches to adjust electrical loading on the bus to maintain the electrical characteristics substantially at a maximum power point of the photovoltaic panels. The controller may also adjust an amount of grid power added to the bus to adjust the electrical characteristics so as to be substantially at a maximum power point of the photovoltaic panels. The controller, upon or after receiving signals indicative of whether one or more loads are switched on or off, may operate the one or more switches based, at least in part, on the received signals. Moreover, the controller may operate one or more variable loads to reduce step-wise electrical loading by the one or more loads.

In yet another embodiment, processing unit 1320 may comprise a controller to measure electrical current generated by a plurality of solar panels, to determine which one or more solar panels among the plurality of solar panels is responsible for a ground fault, to operate electronics (e.g., switches) to disconnect from an input port the one or more solar panels among the plurality of solar panels responsible for the ground fault, and to operate electronics to provide at least a portion of said electrical current at an output port during a presence of said ground fault.

In still another embodiment, processing unit 1320 may comprise a controller to determine an amount of excess electrical power produced by solar generators or wind generators, and to operate one or more switches to use at least a portion of the excess electrical power to modify air conditions in a building.

In still another embodiment, processing unit 1320 may comprise a controller to receive, via low-voltage power lines, an electronic signal representative of a request to change a state of operation of a low-voltage electrical load that receives low-voltage power from a bus via the low-voltage power lines, compare a voltage on the bus with a maximum power point of solar panels that, at least in part, provide power to the bus, and determine whether to change a state of at least one other load based, at least in part, on the comparing. Of course, such details of processing unit 1320 are merely examples, and claimed subject matter is not so limited.

Memory 1322 is representative of any information storage mechanism. Gateway monitor 570, memory 915, or memory 1128 may include memory such as 1322, for example. Memory 1322 may include, for example, a primary memory 1324 or a secondary memory 1326. Primary memory 1324 may include, for example, a random access memory, read only memory, etc. While illustrated in this example as being separate from processing unit 1320, it should be understood that all or part of primary memory 1324 may be provided within or otherwise co-located/coupled with processing unit 1320.

Secondary memory 1326 may include, for example, the same or similar type of memory as primary memory or one or more information storage devices or systems, such as, for example, a disk drive, an optical disc drive, a tape drive, a solid state memory drive, etc. In certain implementations, secondary memory 1326 may be operatively receptive of or otherwise configurable to couple to, a computer-readable medium 1328. Computer-readable medium 1328 may include, for example, any medium that can carry or make accessible information, code, or instructions for one or more of the devices in system 1300. Computing device 1304 may include, for example, an input/output 1332. Input/output 1332 is representative of one or more devices or features that may be configurable to accept or otherwise introduce human or machine inputs, or one or inure devices or features that may be configurable to deliver or otherwise provide for human or machine outputs. By way of example but not limitation, input/output device 1332 may include an operatively configured display, speaker, keyboard, mouse, trackball, touch screen, data port, etc.

It will, of course, be understood that, although particular embodiments have just been described, claimed subject matter is not limited in scope to a particular embodiment or implementation. For example, one embodiment may be in hardware, such as implemented on a device or combination of devices, for example. Likewise, although claimed subject matter is not limited in scope in this respect, one embodiment may comprise one or more articles, such as a storage medium or storage media that, may have stored thereon instructions capable of being executed by a specific or special purpose system or apparatus, for example, to lead to performance of an embodiment of a method in accordance with claimed subject matter, such as one of the embodiments previously described, for example. However, claimed subject matter is, of course, not limited to one of the embodiments described necessarily. Furthermore, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited in scope to this example.

The terms, "and" and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Embodiments described herein may include machines, devices, engines, or apparatuses that operate using digital signals. Such signals may comprise electronic signals, optical signals, electromagnetic signals, or any form of energy that provides information between locations.

In the preceding description, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A device comprising:
   at least one input port to receive low-voltage green-energy power which includes power generated by at least one solar panel;
   at least one input port to receive low-voltage grid power converted from high-voltage utility electrical power;
   at least one port to connect to one or more batteries;
   at least one power output port through which to:
      provide, via power lines, at least a portion of said low-voltage green-energy power, said low-voltage grid power, or electrical power from said batteries to low-voltage electrical loads; and
      receive, via said power lines, an electronic signal representative of a state of operation of said low-voltage electrical loads;
   a bus to:
      receive at least a portion of said low-voltage green-energy power, said low-voltage grid power, or said electrical power from said batteries; and
      provide said at least a portion of said low-voltage green-energy power, said low-voltage grid power, or said electrical power from said batteries to said power output port;
   detection electronics to detect or measure a voltage of said bus;
   comparison electronics to compare said voltage with a maximum power point of said at least one solar panel; and
   a controller to operate one or more switches that are electrically between said bus and said low-voltage electrical loads in response to a result of comparing by said comparison electronics.

2. The device of claim 1, wherein said state of operation comprises an 'off' state, an "on" state, a voltage or current of operation, or a temperature of operation.

3. The device of claim 1 wherein said power lines are structurally integrated with a building.

4. The device of claim 3, further comprising:
   at least one input port to receive electronic signals representative of measurements of air conditions in at least a portion of said building.

5. The device of claim 4, wherein said air conditions comprise one or more of:
   carbon dioxide level, temperature, humidity, and barometric pressure.

6. The device of claim 1, wherein said low-voltage electrical loads comprise lighting loads or motor loads.

* * * * *